(12) United States Patent
Ikuno et al.

(10) Patent No.: US 7,875,689 B2
(45) Date of Patent: Jan. 25, 2011

(54) INK RECEPTIVE PARTICLE, MATERIAL FOR RECORDING, RECORDING APPARATUS AND INK RECEPTIVE PARTICLE STORAGE CARTRIDGE

(75) Inventors: Masaya Ikuno, Kanagawa (JP); Takatsugu Doi, Kanagawa (JP); Ken Hashimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 690 days.

(21) Appl. No.: 11/894,070

(22) Filed: Aug. 20, 2007

(65) Prior Publication Data

US 2008/0196621 A1 Aug. 21, 2008

(30) Foreign Application Priority Data

Feb. 16, 2007 (JP) .............................. 2007-036957

(51) Int. Cl.
*C08F 20/06* (2006.01)

(52) U.S. Cl. .................. 526/317.1; 347/100; 347/103; 347/213; 428/32.34; 523/160; 523/161; 106/31.13

(58) Field of Classification Search .............. 428/32.34; 347/100, 103, 213; 526/317.1; 106/31.13; 523/160, 161
See application file for complete search history.

(56) References Cited

U.S. PATENT DOCUMENTS

2006/0286315 A1 * 12/2006 Hashimoto et al. ....... 428/32.34

FOREIGN PATENT DOCUMENTS

| JP | 5-096720 | 4/1993 |
| JP | 2000-158794 | 6/2000 |
| JP | 2003-080764 | 3/2003 |

* cited by examiner

*Primary Examiner*—David Wu
*Assistant Examiner*—Vu A Nguyen
(74) *Attorney, Agent, or Firm*—Fildes & Outland, P.C.

(57) ABSTRACT

An ink receptive particle comprising an organic resin that is formed by a hydrophilic monomer component and a hydrophobic monomer component, wherein hydrophilic groups in the organic resin include a hydrophilic group having a salt structure and a hydrophilic group not having a salt structure.

17 Claims, 10 Drawing Sheets

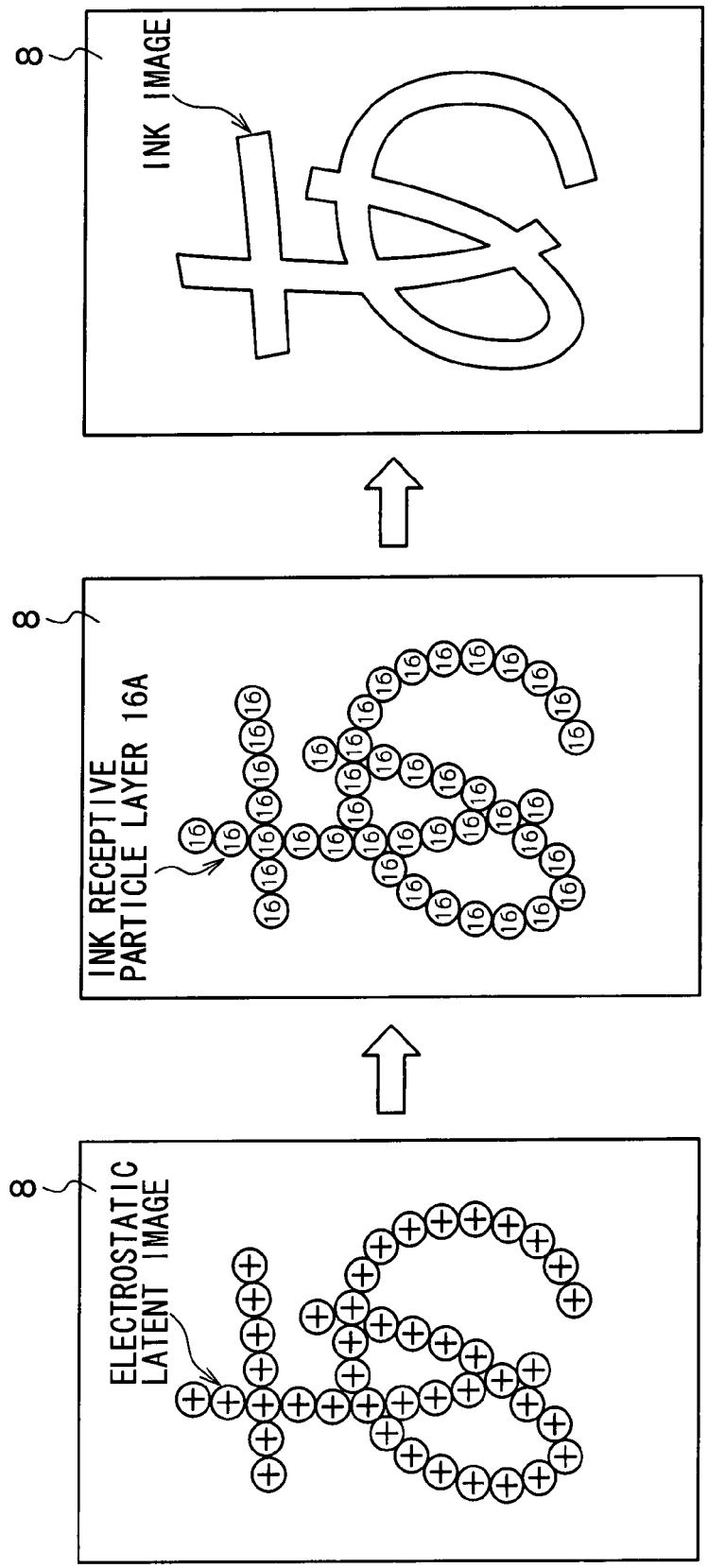

US 7,875,689 B2

INK RECEPTIVE PARTICLE, MATERIAL FOR RECORDING, RECORDING APPARATUS AND INK RECEPTIVE PARTICLE STORAGE CARTRIDGE

CROSS-REFERENCE TO RELATED APPLICATIONS

This application is based on and claims priority under 35 USC 119 from Japanese Patent Application No. 2007-36957 filed Feb. 16, 2007.

BACKGROUND

1. Technical Field

The present invention relates to an ink receptive particle. Further, the invention relates to a material for recording, a recording apparatus, and an ink receptive particle storage cartridge using the ink receptive particle.

2. Related Art

The ink jet recording method is known as one of the methods of recording images and data by using ink. The principle of the ink jet recording method is to record on paper, cloth, film or the like by ejecting liquid or melted solid ink from a nozzle, slit, porous film or the like. Ink ejecting methods include a charge control method of ejecting ink by making use of electrostatic attraction forces, a drop on-demand method (pressure pulse method) of ejecting ink by making use of the oscillation pressure of piezo elements, a thermal ink jet method of ejecting ink by making use of pressure caused by forming and growing foams by intense heat, and others, and a recorded material on which images or data of extremely high definition are recorded can be obtained by using these methods.

SUMMARY

According to an aspect of the present invention, there is provided an ink receptive particle for receiving ink, including an organic resin that is formed by a hydrophilic monomer and a hydrophobic monomer, and the hydrophilic monomer includes a hydrophilic group having a salt structure and a hydrophilic group not having a salt structure.

BRIEF DESCRIPTION OF THE DRAWINGS

Exemplary embodiments of the present invention will be described in detail based on the following figures, wherein:

FIG. 10 is a view conceptually showing a step in which an image is formed in the recording apparatus according to another exemplary embodiment.

DETAILED DESCRIPTION

Figure 1:
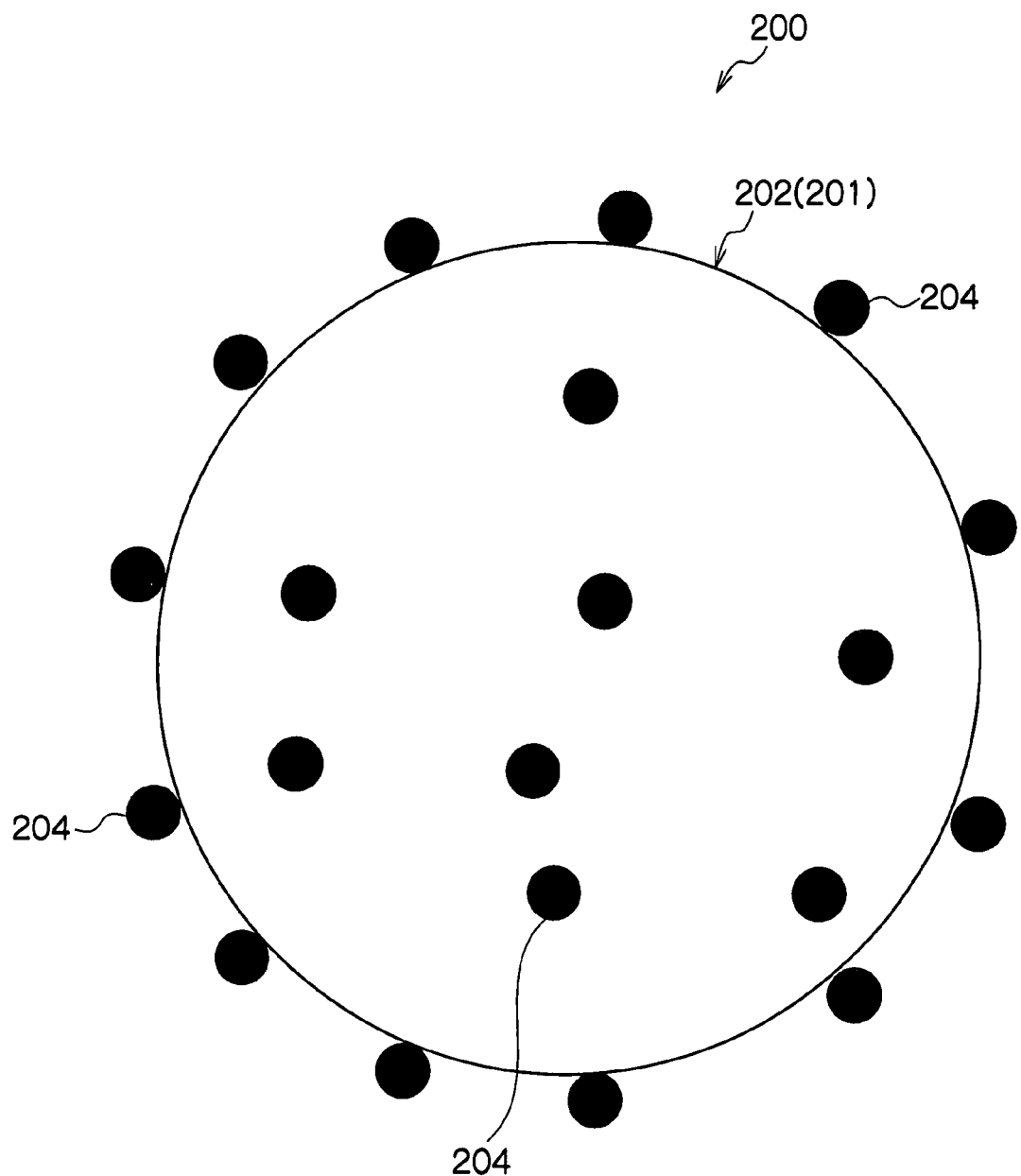
FIG. 1 is a schematic diagram showing an example of an ink receptive particle according to an exemplary embodiment.

Hereinafter, exemplary embodiments will be described in detail. In the present specification ". . . to . . . " represents a range including the numeral values represented before and after "to" as a minimum value and a maximum value, respectively.

(Ink Receptive Particle)

An ink receptive particle in an exemplary embodiment receives ink components when the particle comes in contact with ink. Here, the term "ink receptive" means the ability to retain at least part of the ink components (at least a liquid component).

The ink receptive particle in the exemplary embodiment includes an organic resin formed by a hydrophilic monomer and a hydrophobic monomer, where the hydrophilic monomer includes a hydrophilic group having a salt structure and a hydrophilic group not having a salt structure.

A liquid absorbing particle is formed by using the organic resin which is formed by a hydrophilic monomer containing a hydrophilic group not having a salt structure and a hydrophilic group having a salt structure as well as a hydrophobic monomer. The use of the resultant particles as at least one component particle of the ink receptive particles allows for receiving a variety of inks and achieving a balance between the liquid absorbing capacity and the charging property. This is assumed to be as follows.

When a hydrophilic group having a salt structure comes into contact with liquid (i.e. a liquid component of ink), the salt is dissociated and ionized. It is considered that if a hydrophilic group having a salt structure is dissociated and ionized, ion repulsive force is generated and thus polymeric chains of organic resin are extended, thereby improving the liquid absorbing capacity. With the progress in absorbing liquid by the dissociation of a hydrophilic group having at least some salt structures, the dissociation of a hydrophilic group having the non-dissociated salt structure seems to be accelerated, and thus the liquid absorbing capacity is further improved. On the other hand, if the liquid absorbing capacity is too high, it is difficult to ensure charging property because of extremely high hygroscopicity. Consequently, a hydrophilic group having a salt structure and a hydrophilic group not having a salt structure are contained together. Further, an organic resin constituting the particle is formed with a hydrophilic monomer and a hydrophobic monomer in order to provide a hydrophobic part. This allows for improving the charging property. Therefore, it is assumed that a variety of inks can be received and a balance between the liquid absorbing capacity and the charging property is achieved.

The ink receptive particle in the embodiment of the invention may be composed of a single particle (hereinafter may be referred to as a "primary particle") of a liquid absorbing particle, or may be a composite particle in which at least a liquid absorbing particle is aggregated. The single particle of the liquid absorbing particle or the composite particle in which at least the liquid absorbing particle is aggregated may be referred to as a "mother particle".

Here, in the case of the embodiment in which the ink receptive particle is composed of the single particle of the liquid absorbing particle, if ink is adhered to the ink receptive particle when the ink receptive particle receives ink, at least a liquid component of the ink is absorbed by the liquid absorbing particle.

Thus, the ink receptive particle receives the ink. The ink receptive particle having received the ink is transferred onto the recording medium, and recording is carried out.

In the case where the ink receptive particle is composed of the composite particle in which at least liquid absorbing particles are aggregated, when the ink receptive particle receives the ink, first, the ink is adhered to the ink receptive particle, and at least a liquid component of the ink is trapped by the gaps (hereinafter the gaps (voids) between the particles may be referred to as a "trap structure") between the particles constituting the composite particles (at least liquid absorbing particles). At this time, the recording material among the ink component is adhered to the ink receptive particle surface or is trapped by the trap structure. Then the ink trapped in the voids is absorbed by the particles. Thus, the ink receptive particle receives the ink. The ink receptive particle having received the ink is transferred onto the recording medium, and recording is carried out.

Capturing (trapping) of ink components (liquid components or the recording material) by this trap structure is physical and/or chemical trapping by gaps between particles (physical particle wall structure).

When the composite particle in which at least liquid absorbing particles are aggregated is applied, ink liquid components are captured (trapped) in gaps between particles composing the composite particle (physical particle wall structure), and are also absorbed and retained by the liquid absorbing particles.

After transfer of the ink receptive particle, a component of the liquid absorbing particle composing the ink receptive particle functions as a binder resin or coating resin for the recording material contained in the ink. In particular, it is preferable to apply a transparent resin as the component of the liquid absorbing particle composing the ink receptive particle.

In order to improve the fixing property (rubbing resistance) of ink (e.g. pigment ink) containing dispersed particles or insoluble components such as pigment as a recording material, a large amount of resin needs to be added to the ink. However, when a large amount of polymer is added to the ink (including treatment liquids), the nozzle of the ink ejecting unit may clog, and reliability is decreased. In exemplary embodiments of the invention, by contrast, the organic resin component composing the ink receptive particles functions as such a resin.

Here, "gaps between particles composing the composite particle", namely, the "trap structure" is a physical particle wall structure for retaining at least liquid. The size of the gaps is preferred to be from about 0.1 μm to about 5 μm in the terms of maximum opening size, and more preferably from about 0.3 μm to about 1 μm. In particular, the size of gaps is preferably large enough to trap a recording material, particularly for example, pigment having a volume-average particle diameter of about 100 nm. Fine pores of maximum opening size of less than about 50 nm may be present. In addition, voids, capillary, or the like preferably may communicate with each other inside of the composite particles.

The gap size can be determined by reading a scanning electron microscope (SEM) image of the particle surface by an image analyzer, detecting the gap by binary coding process, and analyzing the size and distribution of gaps.

It is desirable that the trap structure traps not only the liquid component of the ink but also the recording material. When recording material, and especially pigment, is trapped in the trap structure together with the ink liquid components, the recording material is retained and fixed within the ink receptive particle without being unevenly distributed. Ink liquid components are mainly ink solvents or dispersion media (i.e. vehicle liquids).

Hereinafter, the ink receptive particle of the exemplary embodiment will be described in detail. As mentioned above, the ink receptive particle of the exemplary embodiment may be the form in which a mother particle is composed of a single particle of a liquid absorbing particle or may be the form which is composed of a composite particle in which at least liquid absorbing particles are aggregated.

In addition to the above-mentioned organic resin, other components (for example, an inorganic material etc.) may be contained in the liquid absorbing particle.

In the mother particle, inorganic particles may be adhered onto the surface of the liquid absorbing particle or the composite particle.

Figure 2:
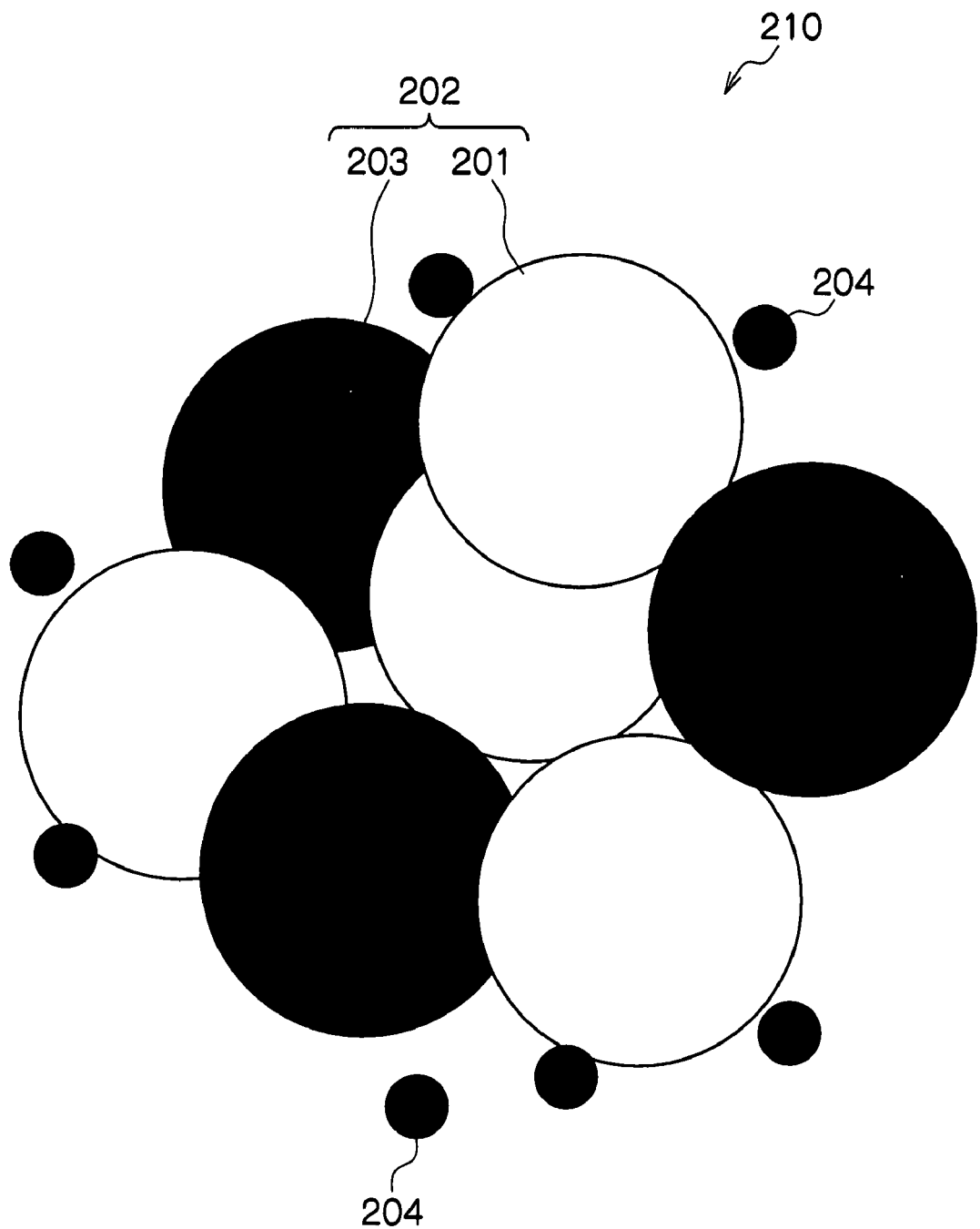
FIG. 2 is a schematic diagram showing another example of the ink receptive particle according to an exemplary embodiment.

Specific constitution of the ink receptive particle of the exemplary embodiment includes, for example, as shown in FIG. 1, the form of an ink receptive particle 200 containing a mother particle 202 composed of a single particle of a liquid absorbing particle 201 and inorganic particles 204 which are adhered to the surface of the mother particle 202 (liquid absorbing particle 201). As shown in FIG. 2, the specific constitution further includes the form of an ink receptive particle 210 containing a mother particle 202 composed of a composite particle in which the liquid absorbing particles 201 are complexed with inorganic particles 203, and inorganic particles 204 which are adhered to the surface of the mother particle 202 (composite particle). In the composite particle, a void structure can be formed by gaps between particles.

The particle size of the entire ink receptive particle is preferred to be from about 0.5 μm to about 50 μm in average spherical equivalent diameter.

The average spherical equivalent diameter is determined as follows. The optimum method depends on particle size. For example, a method in which the particle size is determined by applying the principle of light scattering to a dispersion of the particles in a liquid, a method in which the particle size is determined by image processing of a projected image of the particles, or other methods may be used: Examples which can be given of generally used methods include a Microtrack UPA method or a Coulter counter method.

When the mother particle is composed of the composite particle, the molar ratio of liquid absorbing particles to other particles (liquid absorbing particles:other particles) is preferably, in the case where other particles are inorganic particles, from about 5:1 to about 1:10.

The average spherical equivalent diameter of the mother particle is, for example, from about 0.1 μm to about 50 μm, preferably from about 0.5 μm to about 25 μm, and more preferably from about 1 μm to about 10 μm.

When the mother particle is composed of the composite particle, the BET specific surface area ($N_2$) is preferred to be from about 1 $m^2/g$ to about 750 $m^2/g$.

When the mother particle is composed of the composite particle, the composite particle is obtained, for example, by granulating from particles in a semi-sintered state. The semi-sintered state is a state in which some of the granular shape remains and voids are retained between the particles. When an ink liquid component is trapped in the trap structure, part of the composite particle may be dissociated, that is, the composite particle may be broken up, and particles composing the composite particle may be scattered.

In the case where the mother particle is a primary particle thereof, the average spherical equivalent diameter of the liquid absorbing particle is, for example, from about 0.1 µm to about 50 µm, preferably from about 0.5 µm to about 25 µm, and more preferably from about 1 µm to about 10 µm. In the case where the composite particle is composed, the average spherical equivalent diameter of the liquid absorbing particle is, for example, from about 10 nm to about 30 µm, preferably from about 50 nm to about 10 µm, and more preferably from about 0.1 µm to about 5 µm.

The molar ratio of the liquid absorbing particle to the ink receptive particle as a whole is, for example, about 75% or more, preferably about 85% or more, and more preferably from about 90% to about 99%.

Next, the liquid absorbing particle will be further described in detail. The liquid absorbing particle includes an organic resin which is formed by a hydrophilic monomer and a hydrophobic monomer. A hydrophilic group having a salt structure and a hydrophilic group not having a salt structure are included in the hydrophilic monomer.

Here, examples of the hydrophilic group not having a salt structure include a carboxyl group, a hydroxyl group, an epoxy group, a glycidyl group, a sulfone group, an isocyanate group, an acetic anhydride group, and the like. Among them, a preferable example is a carboxyl group.

On the other hand, examples of the salt structure of the hydrophilic group having a salt structure include a salt structure formed of the hydrophilic group not having a salt structure and an alkali metal, a salt structure formed of the hydrophilic group not having a salt structure and a polyvalent metal, and a salt structure formed of the hydrophilic group not having a salt structure and an organic amine. The alkali metal, polyvalent metal, and organic amine are so-called counter ions forming salt structures.

Examples of the alkali metal include $Na^+$, $Li^+$, $K^+$, and the like. Examples of the polyvalent metal include an aluminum ion, barium ion, calcium ion, copper ion, iron ion, magnesium ion, manganese ion, nickel ion, tin ion, titanium ion, zinc ion, and the like. Examples of the organic amine include primary, secondary, tertiary, and quaternary amines, and salts thereof. Desirable examples of the polyvalent metal ion include an aluminum ion, barium ion, calcium ion, magnesium ion, and zinc ion. Preferable examples of the counter ion forming the above-mentioned salt structure include an alkali metal (e.g. $Na^+$, $Li^+$, $K^+$).

The molar ratio of the hydrophilic group not having a salt structure is preferably from 5 mol % to 50 mol %, or from about 5 mol % to about 50 mol % relative to the total amount of monomer component of the ink receptive particle, more preferably from 10 mol % to 40 mol %, or from about 10 mol % to about 40 mol %, and further preferably from 30 mol % to 40 mol %, or from about 30 mol % to about 40 mol %. When the molar ratio of a hydrophilic group not having a salt structure is too high, the liquid absorbing property tends to be lowered. When the molar ratio of the hydrophilic group not having a salt structure is too low, the charging property tends to be lowered.

The molar ratio of the hydrophilic group having a salt structure is preferably from 5 mol % to 40 mol %, or from about 5 mol % to about 40 mol % relative to the total amount of monomer component of the ink receptive particle, more preferably from 10 mol % to 30 mol %, or from about 10 mol % to about 30 mol %, further preferably from 20 mol % to 30 mol %, or from about 20 mol % to about 30 mol %. When the molar ratio of the hydrophilic group having a salt structure is too high, the charging property tends to be lowered. When the molar ratio of the hydrophilic group having a salt structure is too low, the liquid absorbing property tends to be lowered.

The molar ratio of the hydrophilic group having a salt structure relative to the total amount of the hydrophilic groups is preferably in a range of from 0.3 mol % to 0.7 mol %, or from about 0.3 mol % to about 0.7 mol %, and more preferably in a range of from 0.3 mol % to 0.5 mol %, or from about 0.3 mol % to about 0.5 mol %. Here, the total amount of the hydrophilic groups means an amount represented by the formula "hydrophilic group having a salt structure+hydrophilic group not having a salt structure", and the molar ratio of the hydrophilic group having a salt structure relative to the total amount of the hydrophilic groups means a ratio represented by the formula "hydrophilic groups having a salt structure/(hydrophilic groups not having a salt structure+hydrophilic groups having a salt structure)".

The example of methods containing a hydrophilic group not having a salt structure and a hydrophilic group having a salt structure in the organic resin (hydrophilic monomer) including the following methods:

1) an organic resin is dissolved in a solvent, which is partially neutralized with a base, then the organic resin is aggregated;

2) an organic resin is dissolved in a solvent, which is partially neutralized with a base, then the resultant solution is concentrated to obtain an organic resin; and 3) a base is sprayed onto an organic resin and then dried.

The molar ratio of the hydrophilic group not having a salt structure is determined as follows. An organic resin is dissolved in an IPA (isopropyl alcohol)/water mixture. The molar ratio of [COOH] or [$SO_3H$] is determined by conductimetric titration of the resulting solution using potassium hydroxide. When the solution contains a hydroxyl group, the acid value is measured by a conductimetric titration method in accordance with JIS K 0070. Then, the total molar ratio of the hydrophilic group not having a salt structure is determined.

A total of molar ratio of the hydrophilic group having a salt structure is determined as follows. An organic resin is dissolved in an IPA/water mixture. The molar ratio of [$COO^-$] or [$SO_3^{3-}$] is determined by conductimetric titration of the resulting solution using hydrochloric acid.

Next, the organic resin will be described. Examples of the organic resin composing the liquid absorbing particle includes a copolymer formed by both a hydrophilic monomer and a hydrophobic monomer. However, not only a monomer but also a graft copolymer or a block copolymer which copolymerizes other units at the start of the unit such as a polymer/oligomer structure may be used as the organic resin.

Examples of the hydrophilic monomer include the monomer which contains at least $\alpha$-$\beta$ unsaturated ethylene and has a hydrophilic group not having the salt structure and a hydrophilic group having the salt structure. For example, when the ink receptive particle is charged positively, a monomer having a salt forming structure such as (substituted) amino group, (substituted) pyridine group and its amine salt, or quaternary ammonium salt is preferable. When the ink receptive particle is charged negatively, a monomer having an organic acid group (a carboxyl group, or a sulfone group) and its salt structure is preferable.

Specific examples of the hydrophilic monomer include (meth)acrylic acid, crotonic acid, itaconic acid, itaconic acid monoester, maleic anhydride, maleic acid monoester, fumaric acid, fumaric acid monoester, sorbic acid, vinyl sulfonic acid, sulfonated vinylnaphthalene, hydroxy alkyl, and the like. Among them, a preferable example is (meth)acrylic acid.

Examples of a hydrophilic unit of polymer/oligomer structure include cellulose derivatives such as cellulose, ethyl cellulose, carboxy methyl cellulose; polymerizable carboxylates such as starch derivatives, monosaccharides, polysaccharides, vinyl sulfonic acid, styrene sulfonic acid, acrylic acid, methacrylic acid, (anhydrous) maleic acid, other polymerizable carboxylates and (partially) neutralized salts thereof; vinyl alcohols; vinyl pyrrolidone, vinyl pyridine, amino (meth)acrylate or dimethyl amino(meth)acrylate, or onium salts thereof; amide such as acrylamide and isopropyl acrylamide; vinyl compounds containing polyethylene oxide chain; vinyl compounds containing hydroxyl group; polyesters composed of multifunctional carboxylic acid and polyhydric alcohol; especially branched polyesters having tri- or higher functional acids or acids such as trimellitic acid and containing plural carboxylic acids or hydroxyl groups at the end portion, polyester having polyethylene glycol structure, and the like.

As for the above-mentioned (meth) and (anhydrous), it should be noted that the compound name in parentheses is included (the same holds true for the following).

Examples of the hydrophobic monomer include the monomer which contains at least α-β-unsaturated ethylene and has a hydrophobic group. Preferably, the hydrophobic monomer does not contain a hydrophilic group not having the salt structure or a hydrophilic group having the salt structure.

Specific examples of the monomer having a hydrophobic group which is used as a hydrophobic monomer include olefins (ethylene, butadiene, etc.), styrene, α-methyl styrene, α-ethyl styrene, methyl methacrylate, ethyl methacrylate, butyl methacrylate, acrylonitrile, vinyl acetate, methyl acrylate, ethyl acrylate, butyl acrylate, (meth)lauryl acrylate, and the like. Examples of the hydrophobic monomer include styrene derivatives such as styrene, α-methyl styrene and vinyltoluene, vinyl cyclohexane, vinyl naphthalene, vinyl naphthalene derivatives, alkyl acrylate, phenyl acrylate, (meth)alkyl acrylate, (meth)phenyl acrylate, (meth)cycloalkyl acrylate, alkyl crotonate, dialkyl itaconate, dialkyl maleate, and the derivatives thereof. Among them, butadiene, isoprene, propylene, (meth)alkyl acrylate, alkyl crotonate, alkyl itaconate, alkyl maleate, and styrene are desirably used. Butadiene, (meth)alkyl acrylate, and styrene are more desirably used.

Here, the molar ratio of hydrophobic group is preferably from 20 mol % to 80 mol %, or from about 20 mol % to about 80 mol % relative to the total amount of monomer components contained in the ink receptive particle, and more preferably from 40 mol % to 70 mol %, or from about 40 mol % to about 70 mol %.

The molar ratio of hydrophobic group is determined by the following formula:

The molar ratio of hydrophobic group=100−[the molar ratio of hydrophilic group not having a salt structure]−[the molar ratio of hydrophilic group having a salt structure]

Specific examples of copolymers of the hydrophilic monomer and the hydrophobic monomer include olefin copolymers (or its modifications, or products into which a carboxylic acid unit is introduced by copolymerization) such as styrene/alkyl(meth)acrylate/(meth)acrylic acid copolymer, styrene/(meth)acrylate/(anhydrous) maleic acid copolymer, and ethylene/propylene, branched polyesters enhanced in acid value by trimellitic acid or the like, polyamides, and the like.

Preferably, the organic resin contains a substituted or non-substituted amino group, or a substituted or non-substituted pyridine group. Such a group has a bactericidal effect or interaction with a recording material having an anion group (e.g. a pigment or a dye).

In the organic resin, the molar ratio (hydrophilic monomer: hydrophobic monomer) of hydrophilic unit (hydrophilic monomer) and hydrophobic unit (hydrophobic monomer) is preferably about 5:95 to about 70:30.

The organic resin may be ion-crosslinked by ions supplied from ink. Examples of the unit having carboxylic acid in the resin include copolymers having a carboxylic acid such as (meth)acrylic acid or maleic acid in the organic resin, and (branched) polyesters having a carboxylic acid. Ion crosslinking or acid-base interaction occurs between the carboxylic acid in the resin, and alkaline metal cation, alkaline earth metal cation, organic amine, or onium cation, or the like, which is supplied from liquid such as water-based ink.

The organic resin is preferred to be the liquid absorbing resin, since the absorbed ink liquid component (for example, water-based solvent) acts as plasticizer of resin (polymer), and it is softened and the fixing property is improved.

The organic resin is preferred to be weak liquid absorbing resin. The weak liquid absorbing resin is, for example, when absorbing water as liquid, a hydrophilic resin capable of absorbing several percent (approximately 5 percent) or more and hundreds of percent (approximately 500 percent) or less relative to the mass of the resin, preferably approximately of from 5% to 100%.

The organic resin may have a straight chain structure, but preferably, the organic resin has a branched structure. The organic resin may be non-crosslinked or low crosslinked. The organic resin may be a random copolymer or block copolymer of the straight chain structure, or may be more preferably a polymer of the branched structure (examples thereof including a random copolymer, block copolymer and graft copolymer of branched structure). For example, in the case of polyesters synthesized by polycondensation, the end group can be increased in the branched structure. Such branched structure can be obtained by general techniques, that is, traces (for example, less than 1%) of a crosslinking agent such as divinyl benzene or di(meth)acrylate is added at the time of synthesizing or a large amount of an initiator is added together with the crosslinking agent.

It is effective to add a charge controlling agent for electrophotographic toner such as a salt forming compound of quaternary ammonium salt of low molecular weight, organic borate, and salicylic acid derivative to the organic resin. For controlling the conductivity, it is effective to add conductive (here, the conductivity indicates that the volume resistivity is less than $10^7$ Ω·cm; unless otherwise specified, the same holds true for hereinbelow) or semiconductive (here, the semi-conductivity indicates that the volume resistivity is in the range of from $10^7$ Ω·cm to $10^{13}$ Ω·cm unless otherwise specified, the same holds true for hereinbelow) inorganic materials such as tin oxide and titanium oxide.

The organic resin is preferred to be an amorphous resin, and its glass transition temperature (Tg) is preferably from about 30° C. to about 100° C., and more preferably from about 40° C. to about 60° C. The glass transition temperature (and melting point) is determined from the major maximum peak measured in accordance with ASTMD 3418-8. The major maximum peak can be measured by using DSC-7 (manufactured by PerkinElmer Japan Co., Ltd.). In this apparatus, temperature of a detection unit is corrected by melting point of indium and zinc, and the calorimetric value is corrected by using fusion heat of indium. For the sample, an aluminum pan is used, and for the control, an empty pan is set. Measurement is carried out at an elevated rate of temperature of 10° C./min.

The weight-average molecular weight of the organic resin is, for example, from about 3,000 to about 100,000, or preferably from about 4,000 to about 75,000, and more preferably from about 5,000 to about 50,000.

The weight-average molecular weight is measured under the following conditions. For example, the GPC apparatus used is HLC-8120GPC, SC-8020 (manufactured by Tosoh Corporation), as the column, two pieces of TSK gel, SuperHM-H (manufactured by Tosoh Corporation, 6.0 mm ID×15 cm) are used, and the eluent is THF (tetrahydrofuran). The experiment is carried out under the following conditions: the sample concentration of 0.5%, flow velocity of 0.6 ml/min, sample injection amount of 10 μl, measuring temperature of 40° C., and IR detector. Calibration curve is prepared from ten samples of polystyrene standard samples TSK standards (trade names: A-500, F-1, F-10, F-80, F-380, A-2500, F-4, F-40, F-128, and F-700, manufactured by Tosoh Corporation).

The acid value of the organic resin may be 50 to 777 mg/KOH/g as expressed by carboxylic acid groups (carboxyl group: —COOH). The acid value as expressed by carboxylic acid groups (carboxyl group: —COOH) can be measured as follows.

The acid value is measured by a neutralization titration method in accordance with JIS K 0070. That is, a proper amount of sample is prepared, to which 100 ml of solvent (diethyl ether/ethanol mixture) is added together with several droplets of indicator (phenolphthalein solution). Then, the resulting mixture is stirred and mixed sufficiently in a water bath until the sample is dissolved completely. The solution is titrated with 0.1 mol/L of potassium hydroxide ethanol solution, and an end point is determined when a pale scarlet color of indicator continues for 30 seconds. Acid value A is calculated by the following formula: $A=(B \times f \times 5.611)/S$. In the above formula, A represents acid value, S is the sample amount (g), B is the amount (ml) of 0.1 mol/L of potassium hydroxide ethanol solution used in titration, and f is a factor of 0.1 mol/L of potassium hydroxide ethanol solution.

Next, the inorganic particle composing composite particle together with the liquid absorbing particle as well as the inorganic particle to be adhered to the mother particle together with the hydrophobic organic particle will be described. As inorganic particle, both a porous particle and a non-porous particle may be used. Examples of the inorganic particle include colorless, pale color, or white particles (e.g. colloidal silica, alumina, calcium carbonate, zinc oxide, titanium oxide, tin oxide, and the like). These inorganic particle may be surface treated (partial hydrophobic treatment, introduction of specific functional group, etc.). In the case of silica, for example, a hydroxyl group in silica is treated with a silylating agent such as trimethyl chlorosilane or t-butyl dimethyl chlorosilane to introduce an alkyl group. Then, dehydrochlorination takes place by the silylating agent, and reaction progresses. When an amine is added to this reaction system, hydrochloric acid is transformed into hydrochloride, and therefore, reaction is promoted. The reaction can be controlled by regulating the treating amount or treating conditions of a silane coupling agent having an alkyl group or phenyl group as a hydrophobic group, or a coupling agent such as titanate type or zirconate type. Similarly, surface treatment can also be carried out by using aliphatic alcohols, higher fatty acids, or derivatives thereof. Further, as for the surface treatment, a coupling agent having a cationic functional group such as a silane coupling agent having quaternary ammonium salt structure, (substituted) amino groups, or the like, a coupling agent having fluorine functional group such as fluorosilane, and other coupling agents having anionic functional group such as carboxylic acid may be used. These inorganic particles may be included in liquid absorbing particles, that is to say, they may be internally added thereto.

The average spherical equivalent diameter of the inorganic particle composing the composite particle is, for example, from about 10 nm to about 30 μm, preferably from about 50 nm to about 10 μm, and more preferably from about 0.1 μm to about 5 μm. The average spherical equivalent diameter of the inorganic particles which are adhered to the mother particle is, for example, from about 10 nm to about 1 μm, preferably from about 10 nm to about 0.1 μm, and more preferably about 10 nm to about 0.05 μm.

The ink receptive particle of the exemplary embodiment are preferred to contain components for aggregating or thickening ink components.

The component having such functions may be contained as functional groups, or as compounds in the organic resin. Examples of such a functional group include carboxylic acid, polyvalent metal cation, polyamine, and the like.

Preferred examples of such compound include aggregating agents such as an inorganic an electrolyte, an organic acid, an inorganic acid, and an organic amine.

Examples of the inorganic electrolyte include an alkali metal ion such as a lithium ion, a sodium ion, and a potassium ion; a polyvalent metal ion such as an aluminum ion, a barium ion, a calcium ion, a copper ion, an iron ion, a magnesium ion, a manganese ion, a nickel ion, a tin ion, a titanium ion and a zinc ion; hydrochloric acid, hydrobromic acid, hydriodic acid, sulfuric acid, nitric acid, phosphoric acid, thiocyanic acid, and an organic carboxylic acid such as acetic acid, oxalic acid, lactic acid, fumaric acid, citric acid, salicylic acid and benzoic acid, and organic sulfonic acid salts.

Specific examples of the inorganic electrolyte include an alkali metal salt such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate; and a polyvalent metal salt such as aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

Examples of the organic acid include arginine acid, citric acid, glycine, glutamic acid, succinic acid, tartaric acid, cysteine, oxalic acid, fumaric acid, phthalic acid, maleic acid, malonic acid, lycine, malic acid, the compounds represented by formula (1), and derivatives of the compounds.

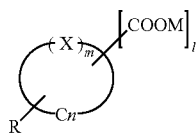

Formula (1)

In formula (1), X represents O, CO, NH, $NR_1$, S, or $SO_2$. $R_1$ represents an alkyl group and is preferably $CH_3$, $C_2H_5$, and $C_2H_4OH$. R represents an alkyl group and is preferably $CH_3$, $C_2H_5$, and $C_2H_4OH$. R may be or may not be included in the formula. X is preferably CO, NH, $NR_1$, and O, more preferably CO, NH, and O. M represents a hydrogen atom, an alkali metal or amines. M is preferably H, Li, Na, K, monoethanol amine, diethanol amine or triethanol amine, more preferably H, Na, and K, and further preferably a hydrogen atom. n represents an integer of from 3 to 7. n is preferably such a number that a heterocyclic ring is a six-membered ring or five-membered ring, and is more preferably such a number that the heterocyclic ring is a five-membered ring. m represents 1 or 2. A compound represented by the formula (1) may be a saturated ring or an unsaturated ring when the compound is the heterocyclic ring. l represents an integer of from 1 to 5.

Specific examples of the compound represented by the formula (1) include the compound having any of furan, pyrrole, pyrroline, pyrrolidone, pyrone, thiophene, indole, pyridine, and quinoline structures, and furthermore, having a carboxyl group as a functional group. Specific examples thereof include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolido-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethylpyrrole-4-carboxylic acid, 2,4,5-trimethylpyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxyproline, 1-methylpyrrolidine-2-carboxylic acid, 5-carboxy-1-methyl pyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid, and 6-methoxy-4-quinoline carboxylic acid.

Preferable examples of the organic acid include citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or the derivatives or salts thereof. The organic acid is more preferably pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or the derivatives or salts thereof. The organic acid is further preferably pyrrolidone carboxylic acid, pyrone carboxylic acid, furan carboxylic acid, coumalic acid, or the derivatives or salts thereof.

An organic amine compound may be any of a primary amine, secondary amine, tertiary amine, quaternary amine or salts thereof. Specific examples of the organic amine compound include a tetraalkyl ammonium, alkylamine, benzalconium, alkylpyridium, imidazolium, polyamine and the derivatives or salts thereof. Specific examples of the organic amine compound include amyl amine, butyl amine, propanol amine, propyl amine, ethanol amine, ethyl ethanol amine, 2-ethyl hexyl amine, ethyl methyl amine, ethyl benzyl amine, ethylene diamine, octyl amine, oleyl amine, cyclooctyl amine, cyclobutyl amine, cyclopropyl amine, cyclohexyl amine, diisopropanol amine, diethanol amine, diethyl amine, di-2-ethylhexyl amine, diethylene triamine, diphenyl amine, dibutyl amine, dipropyl amine, dihexyl amine, dipentyl amine, 3-(dimethyl amino)propyl amine, dimethyl ethyl amine, dimethyl ethylene diamine, dimethyl octyl amine, 1,3-dimethyl butyl amine, dimethyl-1,3-propane diamine, dimethyl hexyl amine, amino butanol, amino propanol, amino propane diol, N-acetyl amino ethanol, 2-(2-amino ethyl amino)-ethanol, 2-amino-2-ethyl-1,3-propane diol, 2-(2-amino ethoxy)ethanol, 2-(3,4-dimethoxy phenyl)ethyl amine, cetyl amine, triisopropanol amine, triisopentyl amine, triethanol amine, trioctyl amine, trityl amine, bis(2-aminoethyl) 1,3-propane diamine, bis(3-aminopropyl)ethylene diamine, bis(3-aminopropyl) 1,3-propane diamine, bis(3-amino propyl)methyl amine, bis(2-ethyl hexyl)amine, bis(trimethyl silyl)amine, butyl amine, butyl isopropyl amine, propane diamine, propyl diamine, hexyl amine, pentyl amine, 2-methyl-cyclohexyl amine, methyl-propyl amine, methyl benzyl amine, monoethanol amine, lauryl amine, nonyl amine, trimethyl amine, triethyl amine, dimethyl propyl amine, propylene diamine, hexamethylene diamine, tetraethylene pentamine, diethyl ethanol amine, tetramethyl ammonium chloride, tetraethyl ammonium bromide, dihydroxy ethyl stearyl amine, 2-heptadecenyl-hydroxyethyl imidazoline, lauryl dimethyl benzyl ammonium chloride, cetylpyridinium chloride, stearamid methylpyridium chloride, a diaryl dimethyl ammonium chloride polymer, and diaryl amine polymer, and a monoaryl amine polymer.

More preferably, triethanol amine, triisopropanol amine, 2-amino-2-ethyl-1,3-propanediol, ethanol amine, propane diamine, and propyl amine are used as the organic amine compound.

Among these aggregating agents, polyvalent metal salts, such as $Ca(NO_3)$, $Mg(NO_3)$, $Al(OH_3)$, and a polyaluminum chloride are preferable.

The aggregating agents may either be used alone or two or more kinds of the aggregating agents may be mixed and used. The content of the aggregating agent is preferably from about 0.01% by mass to about 30% by mass, more preferably from about 0.1% by mass to about 15% by mass, and further preferably from about 1% by mass to about 15% by mass.

In the exemplary embodiments, the average spherical equivalent diameter of the mother particle of ink receptive particle is, preferably, from about 0.1 μm to about 50 μm, more preferably from about 0.5 μm to about 25 μm, and further preferably from about 1 μm to about 10 μm.

When the average spherical equivalent diameter is within the above-mentioned range, high image quality may be achieved compared to the case where the above range is not used. That is, when the average spherical equivalent diameter is too large, a step difference occurs in the height direction, between the particle existing portion and non-existing portion on the image, and smoothness of image may be inferior. On the other hand, when the average spherical equivalent diameter is too small, powder handling property is inferior, and it tends to be hard to supply powder at a desired position on a transfer body. As a result, a liquid absorbing particle absent portion occurs on the image, and high speed recording and high image quality may not be achieved. When the ink receptive particles are composed of primary particles, it is preferred to define the average spherical equivalent diameter in this range.

In an exemplary embodiment, the organic resin is preferred to be weak liquid absorbing resin. The weak liquid absorbing resin is, for example, when absorbing water as liquid, a hydrophilic resin capable of absorbing several percent (approximately 5%) or more and hundreds of percent (approximately 500%) or less relative to the mass of the resin, preferably approximately from 5% to 100%.

If the liquid absorbing capacity of the weak liquid absorbing resin is less than 5%, the ink-retaining capacity of the ink receptive particle is reduced. On the other hand, if the liquid absorbing capacity is greater than 5%, moisture absorption of ink receptive particle is active, and therefore, dependence of the ink receptive particle on the environment is higher.

(Material for Recording)

The material for recording of an exemplary embodiment at least includes an ink containing a recording material, and the ink receptive particle of the exemplary embodiment. The recording material is a material for recording by receiving ink in the ink receptive particle, and transferring the ink receptive particle onto a recording medium.

The ink will be described below in detail. Both water-based ink and oil-based ink can be used, but from the environmental viewpoint, water-based ink is preferred. The water-based ink (hereinafter simply referred to as the ink) contains, in addition to a recording material, an ink solvent (for example, water or water soluble organic solvent). As required, other additives may be also contained.

Next, the recording material will be explained. Examples of the recording material generally include colorants. As the colorant, either a dye or a pigment can be used, but a pigment is preferable. As the pigment, either an organic pigment or an inorganic pigment can be used. Examples of a black pigment include carbon black pigments such as a furnace black, a lamp black, an acetylene black, and a channel black. In addition to black and three primary colors of cyan, magenta and yellow, specific color pigments of red, green, blue, brown, white, or the like, metal glossy pigments of gold, silver, or the like, colorless or pale color extender pigments, plastic pigments, or the like may be used. Moreover, a pigment newly synthesized for the exemplary embodiments may be used as well.

Moreover, particles prepared by fixing a dye or a pigment onto the surface of silica, alumina, polymer beads, or the like as the core, an insoluble lake product of a dye, a colored emulsion, a colored latex, or the like can also be used as a pigment.

Specific examples of the black pigment include Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080 and Raven 1060 (manufactured by Columbian Chemicals Company); Regal 400R, Regal 330R, Regal 660R, Mogul L, Black Pearls L, Monarch 700, Monarch 800, Monarch 880, Monarch 900, Monarch 1000, Monarch 1100, Monarch 1300 and Monarch 1400 (manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degussa): and No. 25, No. 33, No. 40, No. 47, No. 52, No. 900, No. 2300, MCF-88, MA 600, MA 7, MA 8, and MA 100 (manufactured by Mitsubishi Chemical Co., Ltd.). However, the pigments are not restricted thereto.

Specific examples of the cyan color pigments include, but are not limited to, C.I. Pigment Blue-1, -2, -3, -15, -15:1, -15:2, -15:3, -15:4, -16, -22, and -60.

Specific examples of the magenta color pigments include, but are not limited to, C.I. Pigment Red-5, -7, -12, -48, -48:1, -57, -112, -122, -123, -146, -168, -177, -184, -202, and C.I. Pigment Violet-19.

Specific examples of the yellow color pigments include, but are not limited to, C.I. Pigment Yellow-1, -2, -3, -12, -13, -14, -16, -17, -73, -74, -75, -83, -93, -95, -97, -98, -114, -128, -129, -138, -151, -154, and -180.

Here, in the case where a pigment is used as the colorant, it is preferable to use a combination of the pigment and the pigment dispersing agent. As a usable pigment dispersing agent, a polymer dispersing agent, an anionic surfactant, a cationic surfactant, an amphoteric surfactant, a nonionic surfactant, and the like are exemplified.

As the polymer dispersing agent, a polymer having a hydrophilic structure part and a hydrophobic structure part can preferably be used. As the polymer having a hydrophilic structure part and a hydrophobic structure part, a condensation-based polymer and an addition polymer can be used. As the condensation-based polymer, known polyester-based dispersing agents can be exemplified. As the addition polymer, addition polymers of monomers having an $\alpha,\beta$-ethylenically unsaturated group can be exemplified. By copolymerizing optionally a monomer having an $\alpha,\beta$-ethylenically unsaturated group having a hydrophilic group and a monomer having an $\alpha,\beta$-ethylenically unsaturated group having a hydrophobic group in combination, a targeted polymer dispersing agent can be obtained. Moreover, a homopolymer of monomers having an $\alpha,\beta$-ethylenically unsaturated group having a hydrophilic group can be used as well.

As the monomer having an $\alpha,\beta$-ethylenically unsaturated group having a hydrophilic group, monomers having a carboxyl group, a sulfonic acid group, a hydroxyl group, a phosphoric acid group, or the like, such as acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylic amide, methacryloxy ethyl phosphate, bismethacryloxy ethyl phosphate, methacryloxy ethyl phenyl acid phosphate, ethylene glycol dimethacrylate, and diethylene glycol dimethacrylate can be exemplified.

Examples of the monomer having an $\alpha,\beta$-ethylenically unsaturated group having a hydrophobic group include styrene derivatives such as styrene, $\alpha$-methylstyrene and vinyl toluene, vinyl cyclohexane, vinyl naphthalene, vinyl naphthalene derivatives, alkyl acrylate, alkyl methacrylate, phenyl methacrylate, cycloalkyl methacrylate, alkyl crotonate, dialkyl itaconate, dialkyl maleate and the like.

Preferable examples of the copolymer which is used as a polymer dispersant include styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer. Polymers obtained by appropriately polymerizing a monomer having a polyoxyethylene group or a hydroxyl group to these polymers may be used.

The weight-average molecular weight of the polymer dispersant is preferably from 2,000 to 50,000.

These pigment dispersing agents may either be used alone or in combination of two or more. Although the addition amount of the pigment dispersing agent varies with the types of the pigments largely, in general, it is added at a ratio of from 0.1% by mass to 100% by mass in total with respect to the pigment.

A self-dispersible pigment in water can be used as a colorant. The self-dispersible pigment in water used in the invention refers to the pigment having many water-solubilizing groups on the surface of the pigment, which can be stably dispersed in water without adding any polymer dispersant. The self-dispersible pigment in water is practically obtained by applying surface modification treatments such as an acid or a base treatment, a coupling agent treatment, a polymer graft treatment, a plasma treatment or a redox treatment on so-called usual pigments.

As a self-dispersible pigment in water, in addition to the above-described surface-modified pigments, commercially available pigments such as Cab-o-jet-200, Cab-o-jet-300, IJX-157, IJX-253, IJX-266, IJX-273, IJX-444, IJX-55, Cabot 260 (manufactured by Cabot Corporation), and Microjet Black CW-1 and CW-2 (manufactured by Orient Chemical Industries, Ltd.) may also be used as the self-dispersible pigment in water.

As the self dispersing pigment, a pigment having as a functional group at least sulfonic acid, sulfonate, carboxylic acid, or carboxylate on the surface thereof is preferable. A pigment having as a functional group at least carboxylic acid or carboxylate on the surface thereof is more preferable.

The pigment coated with a resin may be used as the colorant. Such pigment is called microcapsule pigments, which include commercially available microcapsule pigments manufactured by Dainippon Ink and Chemicals, Incorporated and TOYO INK MFG Co., Ltd. as well as microcapsule pigments prepared for use in the exemplary embodiments.

Moreover, a resin dispersing type pigment with a polymer substance physically adsorbed or chemically bonded with the above-mentioned pigment can also be used.

Other examples of the recording material include dyes such as hydrophilic anionic dye, direct dye, cationic dye, reactive dye, high molecular dye, and oil-soluble dye, wax powder and resin powder colored by dye, emulsions, fluorescent dye or fluorescent pigment, infrared absorber, ultraviolet absorber, magnetic materials such as ferromagnetic materials represented by ferrite and magnetite, semiconductor and photo catalysts represented by titanium oxide and zinc oxide, and organic and inorganic electronic material particles.

The content (concentration) of the recording material is preferably from about 5% by mass to about 30% by mass.

The volume average particle size of the recording material is preferably from about 10 nm to about 1,000 nm.

The volume average particle size of the recording material denotes the particle size of the recording material itself, or when an additive such as a dispersing agent is adhered onto the recording material, the particle size with the additive adhered. In the invention, as the device for measuring the volume average particle size, MICROTRUCK UPA particle size analysis meter 9340 (manufactured by Leeds & Northrup Corp.) is used. The measurement is carried out with 4 ml of an ink for an inkjet placed in a measurement cell according to a predetermined measuring method. As the parameters to be inputted at the time of the measurement, the viscosity of the ink for an inkjet is inputted as the viscosity, and the density of the recording material is inputted as the density of the dispersion particles.

Next, a water-soluble organic solvent will be described. As a water-soluble organic solvent, polyhydric alcohols, a polyhydric alcohol derivative, a nitrogen-containing solvent, alcohols and a sulfur-containing solvent, and the like may be used.

As specific examples of the water-soluble organic solvent, the polyhydric alcohols include sugar alcohols such as ethylene glycol, diethylene glycol, propylene glycol, butylene glycol, triethylene glycol, 1,5-pentane diol, 1,2-hexane diol, 1,2,6-hexane triol, glycerin, trimethylol propane, and xylitol; and saccharides such as xylose, glucose, and galactose.

Specific examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and the ethylene oxide adduct of diglycerin.

Specific examples of the nitrogen-containing solvent include pyrrolidone, N-methyl-2-pyrrolidone, cyclohexyl pyrrolidone, triethanol amine. Specific examples of the alcohols include ethanol, isopropyl alcohol, butyl alcohol, and benzyl alcohol. Specific examples of the sulfur-containing solvent include thiodiethanol, thiodiglycerol, sulfolane, and dimethyl sulfoxide.

It is also possible to use propylene carbonate, ethylene carbonate, or the like as a water-soluble organic solvent.

It is preferable that at least one kind of water-soluble organic solvent is used. The content of the water-soluble organic solvent to be used may be from about 1% by mass to about 70% by mass.

Next, water will be described. As the water, in order to prevent introduction of impurities, it is particularly preferable to use ion exchange water, ultra pure water, distilled water or ultrafiltrated water.

Next, other additives will be described. A surfactant may be added to the ink.

As the kinds of the surfactants, various kinds of anionic surfactants, nonionic surfactants, cationic surfactants, and amphoteric surfactants, or the like are exemplified. Preferably, the anionic surfactants and the nonionic surfactants are used.

Hereinafter, specific examples of the surfactant will be listed. Examples of the anionic surfactant to be used include alkylbenzenesulfonic acid salt, alkylphenylsulfonic acid salt, alkylnaphthalenesulfonic acid salt, higher fatty acid salt, sulfuric acid ester salt of higher fatty acid ester, sulfonic acid salt of higher fatty acid ester, sulfuric acid ester salt and sulfonic acid salt of higher alcohol ether, higher alkylsulfosuccinic acid salt, polyoxyethylenealkyl ethercarboxylic acid salt, polyoxyethylenealkyl ethersulfuric acid salt, alkylphosphoric acid salt and polyoxyethylenealkyl etherphosphoric acid salt, preferably dodecylbenzenesulfonic acid salt, isopropylnaphthalenesulfonic acid salt, monobutylphenylphenol monosulfonic acid salt, monobutylbiphenylsulfonic acid salt, monobutylbiphenylsulfonic acid salt and dibutylphenylphenoldisulfonic acid salt.

Examples of the nonionic surfactant to be used include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerine fatty acid ester, polyoxyethyleneglycerine fatty acid ester, polyglycerine fatty acid ester, sucrose fatty acid ester, polyoxyethylenealkylamine, polyoxyethylene fatty acid amide, alkylalkanol amide, polyethyleneglycolpolypropyleneglycol block copolymer, acetylene glycol and polyoxyethylene adduct of acetylene glycol, preferably polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide, polyethyleneglycol polypropyleneglycol block copolymer, acetylene glycol and polyoxyethylene adduct of acetylene glycol.

In addition, silicone surfactants such as polysiloxaneoxyethylene adduct, fluorine-based surfactants such as perfluoroalkyl carboxylic acid salt, perfluoroalkyl sulfonic acid salt and oxyethylene perfluoroalkyl ether, and biosurfactants such as spiculisporic acid, rhamnolipid and lysolecithin may also be used.

These surfactants may be used solely or as a mixture. The HLB (hydrophilic-lipophilic balance) of the surfactant is preferably in the range of from about 3 to about 20 in view of dissolving stability, or the like.

The amount of the surfactant to be added is, for example, form about 0.001% by mass to about 5% by mass, and preferably from about 0.01% by mass to about 3% by mass.

Furthermore, various additives can be added to the ink, such as a penetrating agent, or polyethylene imine, polyamines, polyvinyl pyrrolidone, polyethylene glycol, ethyl cellulose, and carboxy methyl cellulose, in order to adjust the penetrability, or in order to control the ink ejection property, and compounds of alkali metals such as potassium hydroxide, sodium hydroxide and lithium hydroxide for adjusting the conductivity and the pH. As needed, a pH buffer, an antioxidant, a fungicide, a viscosity adjusting agent, a conductive agent, an ultraviolet ray absorbing agent, a chelating agent, or the like can be added as well.

Preferred characteristics of the ink will be described. First of all, the pH of the ink is preferred to be about 7 or more, more preferably about 7 to about 11 or less, further preferably from about 8 to about 10.

Here, as the pH of ink, the value measured under the conditions of 23±0.5° C., and 55±5% R.H. by the use of a pH/conductivity meter (trade name: MPC227, manufactured by Mettler Toledo) is used.

The surface tension of the ink is preferred to be from about 20 mN/m to about 45 mN/m (more preferably from about 25 mN/m to about 38 mN/m).

Here, as the surface tension, the value measured under the conditions of 23° C., and 55% RH by the use of the WILL-HERMY type surface tension meter (manufactured by Kyowa Interface Science Co., Ltd.) is used.

The ink viscosity is preferred to be from about 3 mPa·s to about 15 mPa·s (more preferably from about 10 mPa·s to about 10 mPa·s).

The viscosity is a value measured by using RHEOMAT 115 (manufactured by Contraves), at a measuring temperature of 23° C., and a shearing speed of 1400 s$^{-1}$.

The ink composition is not particularly limited to the above, and may include other functional materials such as a crystal material and electronic material, as well as the recording material.

(Ink Receptive Particle Storage Cartridge)

A ink receptive particle storage cartridge in an exemplary embodiment of the invention is detachably disposed in the recording apparatus, and the ink receptive particle storage cartridge is used for holding the ink receptive particle in the exemplary embodiment of the invention, and for supplying the ink receptive particles to a particle applying device (particle supply device) of the recording apparatus.

Figure 3:
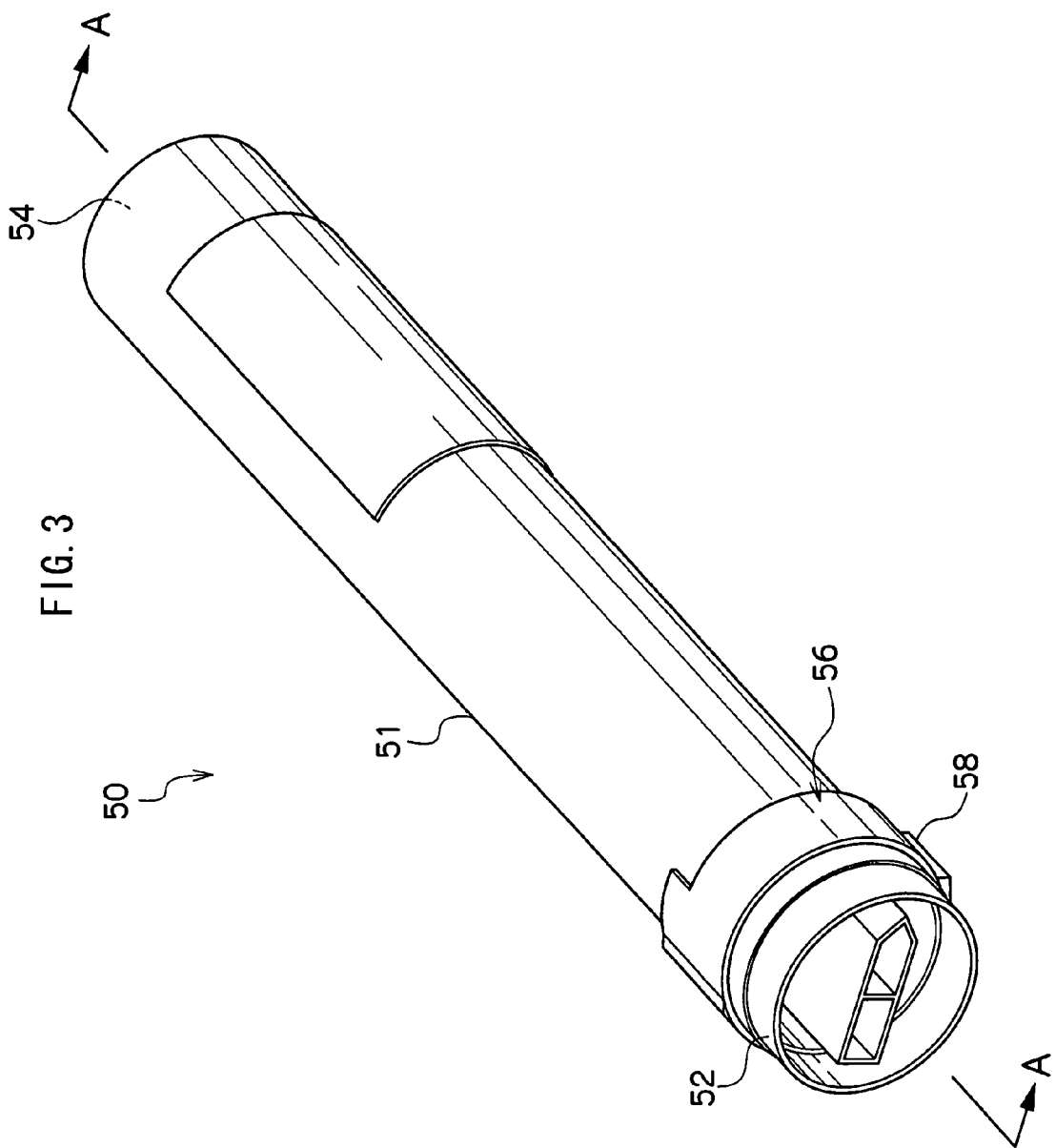
FIG. 3 is a perspective view showing an ink receptive particle storage cartridge according to an exemplary embodiment.
Figure 4:
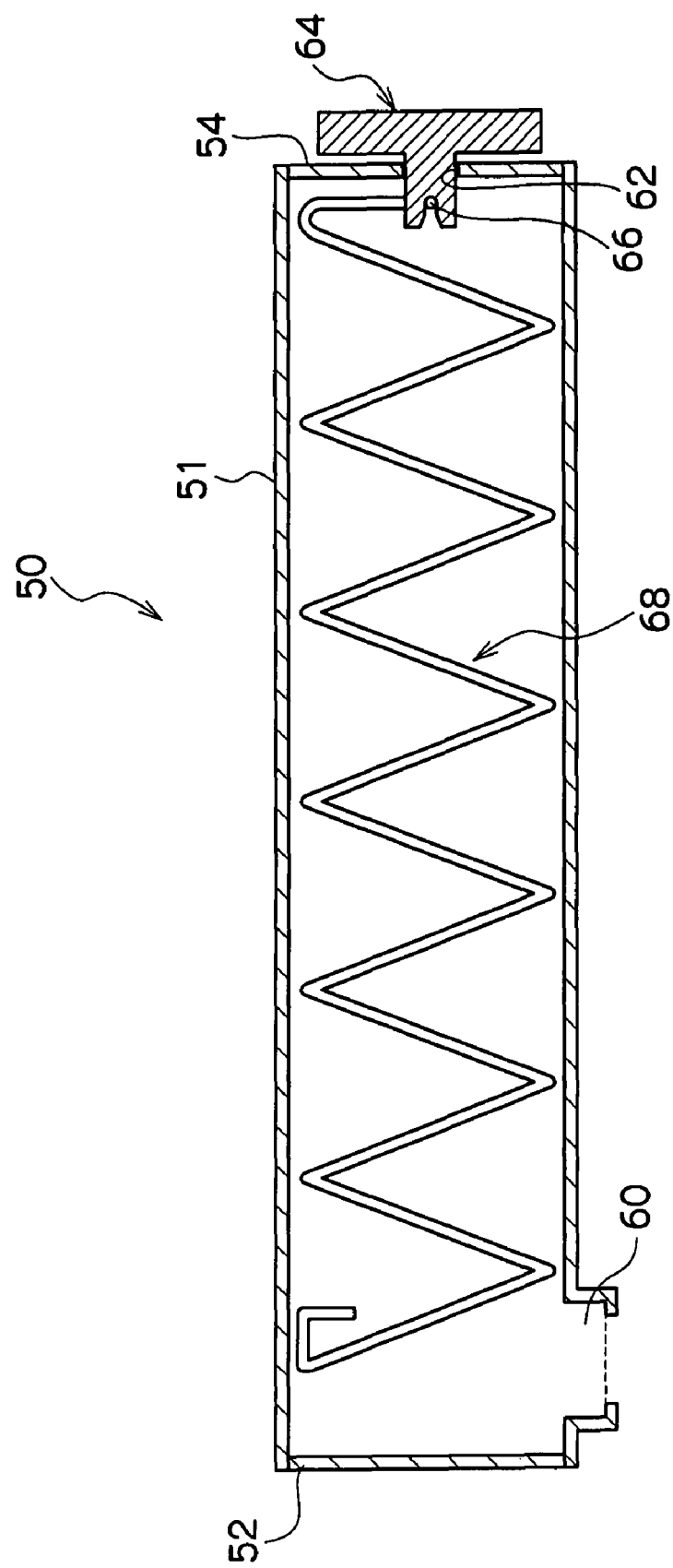
FIG. 4 is a cross-sectional view taken along A-A in FIG. 3.

Hereinbelow, an exemplary embodiment of the ink receptive particle storage cartridge of the invention will be described with reference to the drawings. FIG. 3 is a perspective view showing an ink receptive particle storage cartridge which holds the ink receptive particles according to the exemplary embodiment. FIG. 4 is a cross-sectional view taken along A-A of FIG. 3.

As shown in FIGS. 3 and 4, an ink receptive particle storage cartridge 50 according to the exemplary embodiment includes a cylindrical particle storage cartridge main body 51, and side walls 52, 54 fitted to both ends of the particle storage cartridge main body 51.

A discharge port 60 is provided on a surface of the particle storage cartridge main body 51 at one end, for ejecting ink receptive particles toward the particle applying device (particle supply device; not shown) of the recording apparatus. A belt 56 is slidably provided on the particle storage cartridge main body 51. This belt 56 has a storage unit 58 for accommodating the discharge port 60 at the outer side of the discharge port 60.

Therefore, when the particle storage cartridge 50 is not installed in the recording apparatus (or right after installing), the storage unit 58 accommodates the discharge port 60 so that the ink absorptive particles contained in the particle storage cartridge main body 51 are unlikely to leak from the discharge port 60.

A hole 62 is provided in the center part of the side wall 54 at the other end of the particle storage cartridge main body 51. A junction 66 of a coupling 64 penetrates from the hole 62 of the side wall 54 into the inside of the particle storage cartridge main body 51. As a result, the coupling 64 is free to rotate on the side wall 54.

An agitator 68 is disposed nearly in an entire area of the particle storage cartridge main body 51. The agitator 68 is a metal linear member having a circular cross section, for example, stainless steel (SUS304WP), and is formed in a spiral shape. One end of the agitator is bent in a vertical direction toward the rotary shaft (center of rotation), and is coupled to the junction 66 of the coupling 64. The other end is a free end, being free from restraint.

The agitator 68 receives torque from the junction 66 of the coupling 64, and is put in rotation, and conveys the ink receptive particles in the particle storage cartridge main body 51 toward the discharge port 60 while agitating. Thus, by discharging the particles from the discharge port 60, the recording apparatus can be refilled with ink receptive particles.

The ink receptive particle storage cartridge in the exemplary embodiment of the invention is not limited to the above-described configuration.

(Recording Apparatus)

A recording apparatus (recording method) of the exemplary embodiment is a recording apparatus (recording method) using ink containing a recording material and the ink receptive particles of the exemplary embodiment, which includes an intermediate transfer body, a supply device that supplies the ink receptive particle onto the intermediate transfer body (supply process), an ink ejecting device that ejects an ink toward the ink receptive particle supplied onto the intermediate transfer body (ink ejecting process), and a transfer device that transfers the ink receptive particles onto a recording medium (transfer step), and a fixing device that fixes the ink receptive particle transferred onto the recording medium (fixing process), where the ink receptive particle is supplied onto the intermediate transfer body and receive the ink ejected from the ink discharge means.

Specifically, for example, from the supply device, the ink receptive particles are supplied on an intermediate body (intermediate transfer body) in a layer form. On the supplied layer of ink receptive particles (that is, ink receptive particle layer), ink is discharged from the ink discharge means to be received. The ink receptive particle layer having received the ink is transferred from the intermediate body onto a recording medium by the transfer device. Entire area of the ink receptive particle layer may be transferred, or only a selected recording area (ink receiving area) may be transferred. Then, the ink receptive particle layer transferred on the recording medium is pressurized (or heated and pressurized) and fixed by the fixing means. Thus, the image is recorded by the ink receptive particles having received the ink. Transfer and fixing may be performed either substantially simultaneously or separately.

In order to receive the ink, the ink receptive particles are formed, for example, in a layer, and the thickness of the ink receptive particle layer is preferred to be about 1 μm to about 100 μm or less, more preferably from about 3 μm to about 60 μm, further preferably from about 5 μm to about 30 μm. The porosity of the ink receptive particle layer (that is, porosity of voids between ink receptive particles+porosity of voids in ink receptive particles (trap structure)) is from preferably about 10% to about 80%, more preferably from about 30% to about 70%, and further preferably from about 40% to about 60%.

On the surface of the intermediate body, a releasing agent may be applied preliminarily before supply of the ink receptive particles. Examples of such a releasing agent include (modified) silicone oil, fluorine oil, hydrocarbon oil, mineral oil, vegetable oil, polyalkylene glycol, alkylene glycol ether, alkane diol, fused wax, and the like.

The recording medium may be either permeable medium (e.g. plain paper or coated paper) or impermeable medium (e.g. art paper or resin film). The recording medium is not limited to these examples, and may include semiconductor substrate and other industrial products.

The recording apparatus (recording method) in the exemplary embodiment of the invention may include a supply device that supplies the ink receptive particle onto a recording medium, an ink ejecting device that ejects an ink toward the ink receptive particle supplied onto the recording medium, and a fixing device that fixes the ink receptive particle supplied on the recording medium, where the ink receptive particle is supplied onto the recording medium and receive the ink ejected from the ink ejecting device.

Specifically, first of all, from the supply device, the ink receptive particle is supplied onto the recording medium in a layer form. On the supplied layer of ink receptive particle (that is, ink receptive particle layer), ink is ejected from the ink ejecting device to be received. The ink receptive particle layer having received the ink is pressurized (or heated and pressurized) and fixed by the fixing means. Thus, the image is recorded by the ink receptive particle having received the ink. Thus, the ink receptive particle may be supplied directly on the recording medium.

Hereinbelow, exemplary embodiments of the invention will be described with reference to drawings. The same symbol is given to the member which has substantially the same effect and function and the overlapped description is not repeated here.

Figure 5:
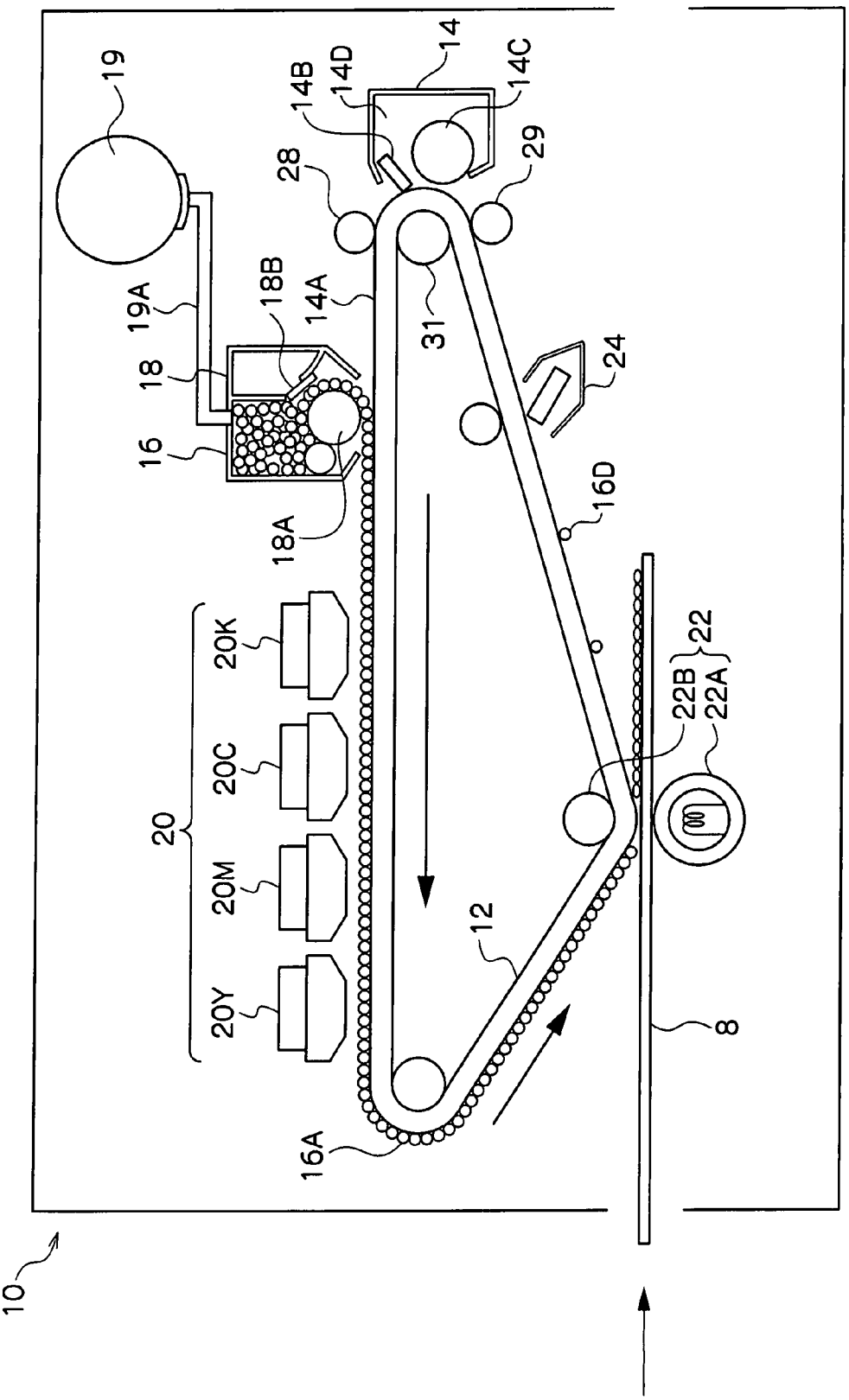
FIG. 5 is a block diagram showing a recording apparatus according to an exemplary embodiment.
Figure 6:
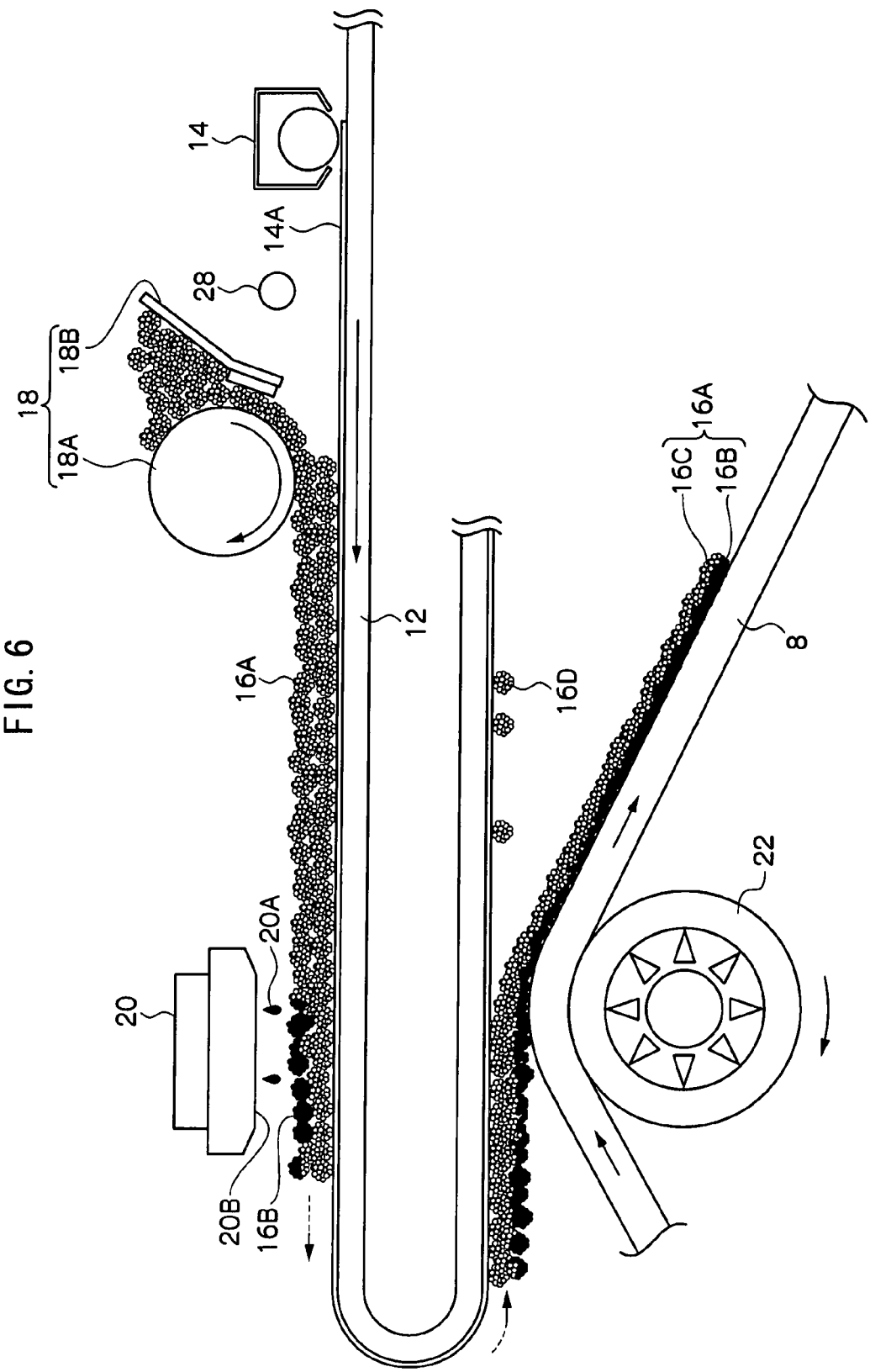
FIG. 6 is a block diagram showing a major portion of the recording apparatus according to an exemplary embodiment.

FIG. 5 is a block diagram showing a recording apparatus according to the exemplary embodiment. FIG. 6 is a block diagram showing a major portion of the recording apparatus according to the exemplary embodiment. FIG. 7 is a block diagram showing the ink receptive particle layer according to the exemplary embodiment. In exemplary embodiments below, the case where composite particles are applied as the ink receptive particles which will be described later is explained.

As shown in FIGS. 5 and 6, a recording apparatus 10 in the exemplary embodiment includes an endless belt-shaped the intermediate transfer body 12, a charging device 28 for charging the surface of the intermediate transfer body 12, a particle supplying device 18 for forming a particle layer by supplying ink receptive particles 16 onto a charged region on the intermediate transfer body 12, an ink jet recording head 20 for forming an image by ejecting ink droplets onto the particle layer, and a transfer fixing device 22 for transferring and fixing an ink receptive particle layer on a recording medium 8 by overlapping the intermediate transfer body 12 with the recording medium 8 and by applying pressure and heat. An ink receptive particle storage cartridge 19 is detachably coupled to the particle supplying device 18 with a supply tube 19A provided therebetween.

At the upstream side of the charging device 28, a releasing agent supplying device 14 is disposed for forming a releasing layer 14A by supplying a releasing agent 14D.

An electric charge is formed on the surface of the intermediate transfer body 12 by the charging device 28, and an ink receptive particle layer 16A is formed by the particle supplying device. On the particle layer, ink droplets in each color are ejected from ink jet recording heads 20 of individual colors, that is, 20K, 20C, 20M, 20Y, and a color image is formed.

The ink receptive particle layer on which the color image layer is formed is transferred onto the recording medium 8 in each color image by the transfer fixing device (transfer fixing roll) 22. At the downstream side of the transfer fixing device 22, a cleaning device 24 is disposed for removing deposits sticking onto the intermediate transfer body such as the ink receptive particles 16 remained on the surface of the intermediate transfer body 12, and foreign matter (paper dust of recording medium 8 or the like) other than particles.

The recording medium 8 on which the color image is transferred is directly conveyed out, and the surface of the intermediate transfer body 12 is charged again by the charging device 28. At this time, the ink receptive particles transferred onto the recording medium 8 absorb and hold the ink droplets 20A, and can be quickly conveyed.

As required, a neutralization apparatus 29 may be installed between the cleaning device 24 and the releasing agent supplying device 14 (unless otherwise specified, the term "a region between A and B" indicates a region that includes neither A nor B.) in order to remove the residual electric charge on the surface of the intermediate transfer body 12.

In the exemplary embodiments, the intermediate transfer body 12 is composed of a base layer of polyimide film of 1 mm in thickness, on which a surface layer of ethylene propylene diene monomer (EPDM) rubber of 400 μm in thickness is formed. Herein, the surface resistivity is preferably approximately $10^{13}$ Ω/sq., and the volume resistivity is approximately $10^{12}$ Ω·cm (semi-conductivity).

The intermediate transfer body 12 is moved to convey, and a releasing layer 14A is formed on the surface of the intermediate transfer body 12 by the releasing agent supplying device 14. A releasing agent 14D is applied on the surface of the intermediate transfer body 12 by a supply roll 14C of the releasing agent supplying device 14, and the layer thickness is regulated by a blade 14B.

At this time, in order to form an image and print continuously, the releasing agent supplying device 14 may be formed to continuously contact with the intermediate transfer body 12, or may be appropriately separated from the intermediate transfer body 12.

From an independent liquid supply system (not shown), the releasing agent 14D may be supplied into the releasing agent supplying device 14, so that the supply of the releasing agent 14D is not interrupted.

By applying a positive charge onto the surface of the intermediate transfer body 12 by the charging device 28, a positive charge is applied onto the surface of the intermediate transfer body 12. A potential capable of supplying and adsorbing the ink receptive particles 16 onto the surface of the intermediate transfer body 12 may be formed by an electrostatic force of an electric field which can be formed between the supply roll 18A of the ink receptive particle supplying device 18 and the surface of the intermediate transfer body 12.

In the exemplary embodiments, using the charging device 28, a voltage is applied between the charging device 28 and a driven roll 31 (connected to ground), between which the intermediate transfer body 12 is disposed, and the surface of the intermediate transfer body 12 is charged.

The charging device 28 is a roll shape member adjusted to a volume resistivity of about from $10^6$ Ω·cm to $10^8$ Ω·cm which forms an elastic layer (foamed urethane resin) dispersed with a conductive material on the outer circumference of a stainless steel bar material. The surface of the elastic layer is coated with a coating layer (e.g. tetrafluoroethylene-perfluoroalkylvinyl ether copolymer (PFA)) of water-repellent and oil-repellent property of approximately from 5 μm to 100 μm in thickness.

A DC power source is connected to the charging device 28, and the driven roll 31 is electrically connected to the frame ground. The charging device 28 is driven together with the driven roll 31, while the intermediate transfer body 12 is disposed between the charging device 28 and the driven roll 31. At the pressed position, since a specified potential difference occurs between the grounded driven roll 31 and the charging device 28, an electric charge can be applied onto the surface of the intermediate transfer body 12. Here, a voltage of 1 kV is applied onto the surface of the intermediate transfer body 12 by the charging device 28, and the surface of the intermediate transfer body 12 is charged.

The charging device 28 may be composed of corotron and the like.

The ink receptive particles 16 are supplied from the particle supplying device 18 onto the surface of the intermediate transfer body 12, and an ink receptive particle layer 16A is formed. The particle supplying device 18 has an ink receptive particle supply roll 18A in the portion facing the intermediate transfer body 12 in the container containing the ink receptive particles 16, and a charging blade 18B is disposed so as to press the ink receptive particle supply roll 18A. The charging blade 18B also functions to regulate the film thickness of the ink receptive particles 16 supplied and adhered onto the surface of the ink receptive particle supply roll 18A.

The ink receptive particles 16 are supplied by the ink receptive particle supply roll 18A (conductive roll), and the ink receptive particle layer 16A is regulated by the charging blade 18B (conductive blade), and is charged negatively with the reverse polarity of the electric charge on the surface of the intermediate transfer body 12. The supply roll 18A may be aluminum solid rolls, and the charging blade 18B may be made of metal plates (such as SUS) being coated with urethane rubber in order to apply pressure. The charging blade 18B is contacting with the supply roll 18A in a type of doctor blades.

The charged ink receptive particles 16 form, for example, one layer of particles on the surface of the ink receptive particle supply roll 18A, and are conveyed to a position opposite to the surface of the intermediate transfer body 12. When coming close to the intermediate transfer body 12, the charged ink receptive particles 16 are moved electrostatically onto the surface of the intermediate transfer body 12 by the electric field formed by the potential difference between the surfaces of the ink receptive particle supply roll 18A and the intermediate transfer body 12.

At this time, the relative ratio (peripheral speed ratio) of moving speed of the intermediate transfer body 12 and rotating speed of the supply roll 18A is determined so that one layer of particles is formed on the surface of the intermediate transfer body 12. This peripheral speed ratio depends on the charging amount of the intermediate transfer body 12, charging amount of the ink receptive particles 16, relative position of the supply roll 18A and the intermediate transfer body 12, and other parameters.

On the basis of the peripheral speed ratio for forming one layer of the ink receptive particle layer 16A, when the peripheral speed of the supply roll 18A is relatively accelerated, the number of particles supplied on the intermediate transfer body 12 may be increased. That is, when the transferred image density is low (an amount of the ink load is small, e.g. 0.1 $g/m^2$ to 1.5 $g/m^2$), the layer thickness is regulated to a minimally required limit (e.g. 1 μm to 5 μm), and when the image density is high (an amount of the ink load is large, e.g. 4 $g/m^2$ to 15 $g/m^2$ or less), it is preferred to regulate to a sufficient layer thickness (e.g. 10 μm to 25 μm) for holding the ink liquid component (solvent or dispersion medium).

For example, in the case of a character image at which an amount of ink load is small, when forming an image on one ink receptive particle layer on the intermediate transfer body, the image forming material (pigment) in the ink is trapped on the surface of the ink receptive particle layer on the intermediate transfer body, and is fixed on the surface of the ink receptive particles and the porous particles, so that the distribution is smaller in the depth direction.

For example, when it is desired to form a particle layer 16C to be a protective layer on an image layer 16B to be a final image (see FIG. 7 (A)), the ink receptive particle layer 16A is formed at substantially three layers thick, and the ink image is formed on the highest layer only, so that the remaining two layers not forming image can be formed on the image layer 16B as protective layers after transferring and fixing (see FIG. 7 (B)).

Alternatively, when forming an image in two or more colors, or an image at which an amount of ink load is large, the ink receptive particles 16 are layered, so that a recording material (e.g. pigment) is trapped on the surface of particles and fixing particles capable of holding the ink liquid component (solvent or dispersion medium) and forming the ink receptive particles 16, and the number of particles is sufficient for the pigment not to reach the lowest layer. In this case, the image forming material (pigment) is not exposed on the image layer surface after transferring and fixing, and the ink receptive particles 16 not forming image may be formed as a protective layer on the image surface.

Next, the ink jet recording head 20 applies ink droplets 20A to the ink receptive particle layer 16A. Based on the specified image information, the ink jet recording head 20 applies the ink droplets 20A to specified positions.

Finally, by nipping the recording medium 8 and the intermediate transfer body 12 by the transfer fixing device 22, and applying pressure and heat to the ink receptive particle layer 16A, the ink receptive particle layer 16A is transferred onto the recording medium 8.

The transfer fixing device 22 is composed of a heating roll 22A incorporating a heating source, and a pressurizing roll 22B, between which the intermediate transfer body 12 is disposed and which are opposite to each other, and the heating roll 22A and pressurizing roll 22B contact each other to form a contact region. The heating roll 22A and pressurizing roll 22B are formed of an aluminum core, coated with silicone rubber on the outer surface, and are further covered with a PFA tube.

In the contact region of the heating roll 22A and pressurizing roll 22B, the ink receptive particle layer 16A is heated by the heater and is pressurized, and hence the ink receptive particle layer 16A is fixed simultaneously when transferred onto the recording medium 8.

At this time, resin particles composing the ink receptive particles 16 in a non-image portion are heated above the glass transition temperature (Tg), and are softened (or fused), and the ink receptive particle layer 16A is released from the releasing layer 14A formed on the surface of the intermediate transfer body 12 by the pressure, and is transferred and fixed on the recording medium 8. Then, the ink receptive particle layer 16A is released from the releasing layer 14A formed on the surface of the intermediate transfer body 12 by the pressure, and is transferred and fixed onto the recording medium 8. At this time, transfer fixing property is improved by heating. In this embodiment, the surface of the heating roll 22A is controlled at 160° C. At this time, the ink liquid component (solvent or dispersion medium) held in the ink receptive particle layer 16A is held in the same ink receptive particle layer 16A even after transfer, and is fixed. Before the transfer fixing device 22, the efficiency of transfer and fixing may be enhanced by preheating the intermediate transfer body 12.

The recording medium 8 may be either permeable medium (e.g. plain paper or ink jet coated paper) or impermeable medium (e.g. art paper or resin film). The recording medium is not limited to these examples, and may include semiconductor substrate and other industrial products.

Hereinafter, the image forming process of a recording apparatus in the exemplary embodiment will be described in detail. In the recording apparatus in the exemplary embodiment, as shown in FIG. 6, on the surface of the intermediate transfer body 12, a releasing layer 14A is formed by a releasing layer supplying device 14. If the material of the intermediate transfer body 12 is aluminum or PET base, the effect of the releasing layer 14A is particularly large. Alternatively, by using the material such as fluoroplastic or silicone rubber, the surface of the intermediate transfer body 12 may be provided with releasing property.

Next, the surface of the intermediate transfer body 12 is charged with the reverse polarity of the ink receptive particles 16 by the charging device 28. As a result, the ink receptive particles 16 supplied by the supply roll 18A of the particle supplying device 18 can be adsorbed electrostatically, and a layer of the ink receptive particles 16 can be formed on the surface of the intermediate transfer body 12.

Further, on the surface of the intermediate transfer body 12, ink receptive particles 16 are formed as a layer by the supply roll 18A of the particle supplying device 18. For example, the ink receptive particle layer 16A is formed such that a thickness thereof corresponds to substantially three layers of the ink receptive particles 16. That is, the ink receptive particle layer 16A is regulated to a desired thickness by the gap between the charging blade 18B and the supply roll 18A, and thus, the thickness of the ink receptive particle layer 16A transferred on the recording medium 8 is regulated. Alternatively, it may be regulated by the peripheral speed ratio of the supply roll 18A and the intermediate transfer body 12.

On the formed ink receptive particle layer 16A, ink droplets 20A are ejected from ink jet recording heads 20 of individual colors driven by piezoelectric or thermal systems, and an image layer 16B is formed on the ink receptive particle layer 16A. The ink droplets 20A ejected from the ink jet recording head 20 are loaded to the ink receptive particle layer 16A, and a liquid component of the ink is promptly absorbed by voids formed between the ink receptive particles 16 and the voids between particles forming the ink receptive particles 16, and a recording material (e.g. pigment) is trapped on the surface of (particles forming) the ink receptive particles 16 or the voids between particles forming the ink receptive particles 16.

At this time, the ink liquid component (solvent or dispersion medium) which is contained in the ink droplets 20A permeates into the ink receptive particle layer 16A, however the recording material such as pigment is trapped on the surface of the ink receptive particle layer 16A or the voids between particles. That is, the ink liquid component (solvent or dispersion medium) may permeate to the back side of the ink receptive particle layer 16A, however the recording material, such as pigment, does not permeate to the back side of the ink receptive particle layer 16A. Hence, when transferred onto the recording medium 8, the particle layer 16C not permeated with the recording material, such as pigment, forms a layer on the image layer 16B. As a result, this particle layer 16C becomes a protective layer for sealing the surface of the image layer 16B, and an image in which the recording material (or example, a coloring material such as pigment) is not exposed on the surface can be formed.

Next, by transferring and/or fixing the ink receptive particle layer 16A on which the image layer 16B is formed on the recording medium 8 from the intermediate transfer body 12, a color image is formed on the recording medium 8. The ink receptive particle layer 16A on the intermediate transfer body 12 is heated and pressurized by the transfer fixing device (transfer fixing roll) 22 heated by heating means such as a heater, and transferred onto the recording medium 8.

At this time, by adjusting heating and pressurizing as mentioned below, the roughness of the image surface can be properly adjusted, and the degree of gloss can be controlled. Alternatively, the degree of gloss may be controlled by cooling and peeling off.

After peeling off the ink receptive particle layer 16A, residual particles 16D remaining on the surface of the intermediate transfer body 12 are collected by the cleaning device 24 (see FIG. 5), and the surface of the intermediate transfer body 12 is charged again by the charging device 28, and the ink receptive particles 16 are supplied to form the ink receptive particle layer 16A.

FIG. 7 shows particle layers used in forming of images in the exemplary embodiment of the invention. As shown in FIG. 7 (A), on the surface of the intermediate transfer body 12, a releasing layer 14A is formed.

Next, on the surface of the intermediate transfer body 12, a layer of the ink receptive particles 16 is formed by the particle supplying device 18. The ink receptive particle layer 16A formed as mentioned above is preferred to be formed such that a thickness thereof corresponds to substantially three layers of the ink receptive particles 16. By regulating the ink receptive particle layer 16A to a desired thickness, the thickness of the ink receptive particle layer 16A transferred onto the recording medium 8 is controlled. At this time, the surface of the ink receptive particle layer 16A is formed in a uniform thickness so as not to disturb image forming (forming of image layer 16B) by ejection of ink droplets 20A.

Figure 7A:
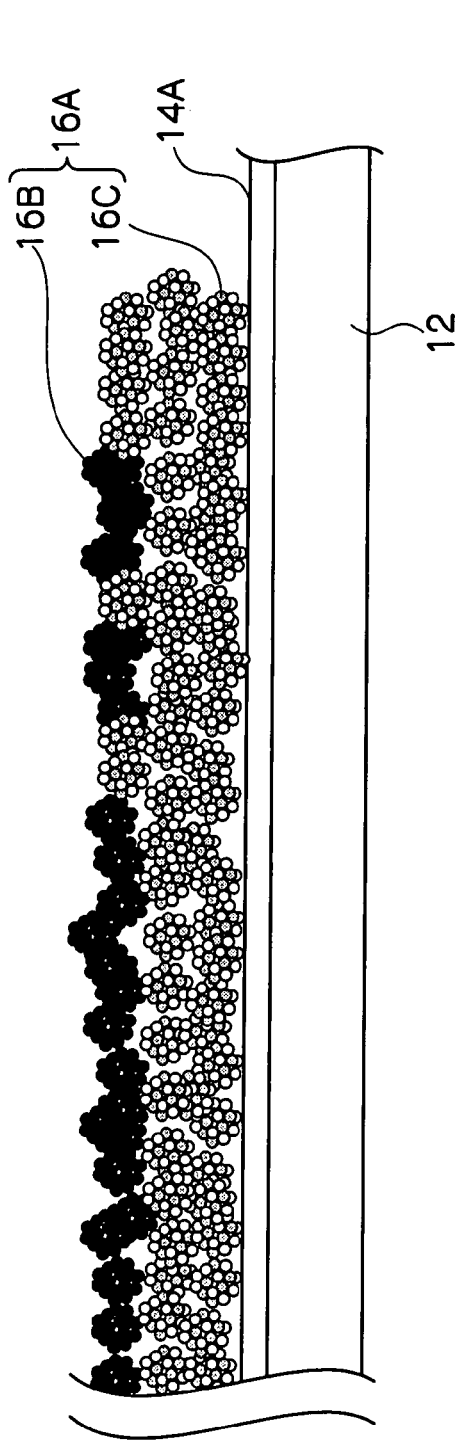
FIG. 7 is a block diagram showing an ink receptive particle layer according to an exemplary embodiment.

The recording material such as pigment contained in the ejected ink droplets 20A permeates into substantially one third or more and half or less of the ink receptive particle layer 16A as shown in FIG. 7(A), and a particle layer 16C into which recording material such as pigment has not permeated is remaining beneath it.

Figure 7B:
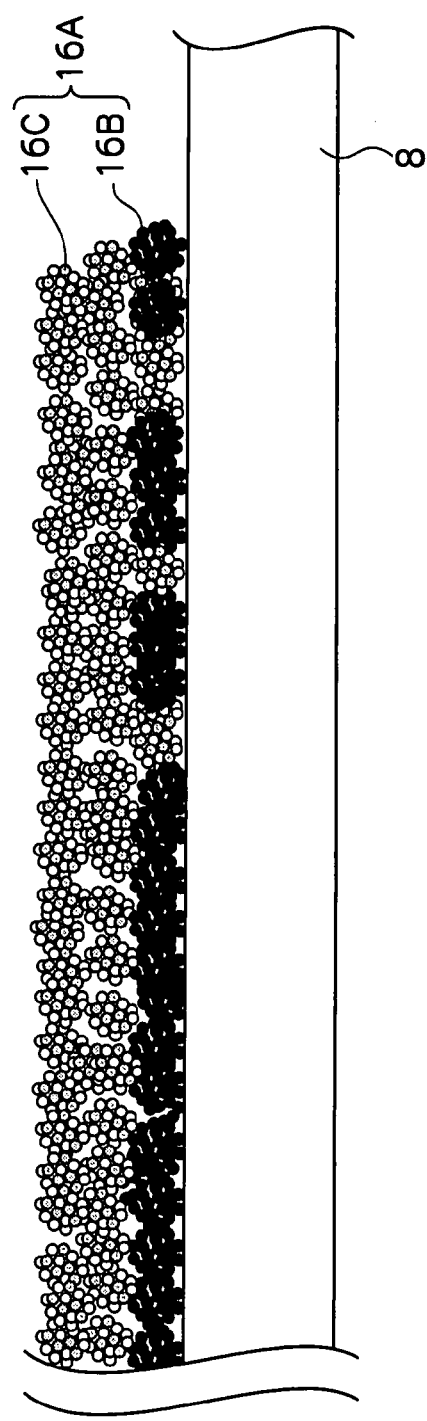

When the ink receptive particle layer 16A is formed on the recording medium 8 by heating, pressurizing and transferring using the transfer fixing device (transfer fixing roll) 22, as shown in FIG. 7(B), a particle layer 16C not containing ink is present on the image layer 16B, and the layer functions as a protective layer for the ink image layer 16B. Accordingly, the ink receptive particles 16, at least after fixing, must be transparent.

The particle layer 16C is heated and pressurized by the transfer fixing device (transfer fixing roll) 22, and thus its surface can be made sufficiently smooth, and the degree of gloss of the image surface can be controlled by heating and pressurizing.

Further, drying of the ink liquid component (solvent or dispersion medium) trapped inside the ink receptive particles 16 may be promoted by heating.

The ink liquid component (solvent or dispersion medium) which is received and held in the ink receptive particle layer 16A is also held in the ink receptive particle layer 16A after transferring and fixing, and is removed by natural drying.

Through the above process, the image forming is completed. If residual particles 16D remaining on the intermediate transfer body 12 or foreign matter such as paper dust removed from the recording medium 8 are present, after transfer of the ink receptive particles 16 on the recording medium 8, they may be removed by the cleaning device 24.

Further, the neutralization apparatus 29 may be disposed at the downstream side of the cleaning device 24. Using a conductive roll as the neutralization apparatus 29, and a voltage of approximately ±3 kV, 500 Hz is applied to the surface of the intermediate transfer body 12 between the conductive roll and a driven roll 31 (grounded), and the surface of the intermediate transfer body 12 can be neutralized.

The charging voltage, particle layer thickness, fixing temperature and other mechanical conditions are determined in optimum conditions depending on the composition of the ink receptive particles 16 or ink, ink ejection volume, and the like, and hence desired effects can be obtained by optimizing each condition.

<Constituent Elements>

Constituent elements in the respective exemplary embodiment of the invention will be specifically described below.

<Intermediate Transfer Body>

The intermediate transfer body 12 on which the ink receptive particle layer is formed may be either belt or cylindrical (drum) as the exemplary embodiment. To supply and hold ink receptive particles on the surface of the intermediate transfer body by an electrostatic force, the outer circumferential surface of the intermediate transfer body must have particle holding property of semiconductive or insulating properties. As electric characteristics for the surface of the intermediate transfer body, it is required to use a material having surface resistance of from $10^{10}$ Ω/sq. to $10^{14}$ Ω/sq. and volume resistivity of from $10^9$ Ω·cm to $10^{13}$ Ω·cm in the case of the semiconductive property, and surface resistance of $10^{14}$ Ω/sq. to volume resistivity of $10^{13}$ Ω·cm or more in the case of the insulating property.

In the case of belt shape, the base material is not particularly limited as long as it is capable of rotating and driving a belt in the apparatus and has the mechanical strength needed to withstand the rotating and driving, and it has the heat resistance needed to withstand heat when heat is used in transfer/fixing. Specific examples of the base material are polyimide, polyamide imide, aramid resin, polyethylene terephthalate, polyester, polyether sulfone, and stainless steel.

In the case of drum shape, the base material includes aluminum, stainless steel or the like.

In order to apply heating system by electromagnetic induction to the fixing process in the transfer fixing device (transfer fixing roll) 22, a heat generating layer may be formed on the intermediate transfer body 12, not on the transfer fixing device 22. The heat generating layer is made of a metal causing electromagnetic induction action. For example, nickel, iron, copper, aluminum or chromium may be used selectively.

<Particle Supply Process>

Before supplying the ink receptive particles 16, a releasing agent 14D is applied on the surface of the intermediate transfer body 12 to form a releasing layer 14A using the releasing agent supplying device 14.

The method of supplying the releasing layer 14A may include a method that involves processes of containing the releasing agent 14D, supplying the releasing agent 14D to a releasing agent supply member, and forming the releasing layer 14A by supplying the releasing agent 14D to the surface of the intermediate transfer body 12 by the supply member or a method that involves a process of forming the releasing layer 14A on the surface of the intermediate transfer body 12 by the supply member that is impregnated with the releasing agent 14D.

Examples of the releasing agent 14D include releasing materials such as silicone oil, fluorine oil, poly alkylene glycol, and surfactants.

Examples of the silicone oil include straight silicone oil, modified silicone oil. Examples of the straight silicone oil include dimethyl silicone oil and methyl hydrogen silicone oil. Examples of the modified silicone oil include methyl styryl-modified oil, alkyl-modified oil, higher fatty acid ester-modified oil, fluorine-modified oil, amino-modified silicon oil. Examples of the poly alkylene glycol include polyethylene glycol, polypropylene glycol, ethyleneoxide/propylene oxide copolymer, and polybutylene glycol. Among them, polypropylene glycol is desirably used. Examples of the surfactant include anionic surfactants, cationic surfactants, amphoteric surfactants, and nonionic surfactants. Among them, the nonionic surfactant is desirably used.

The viscosity of the releasing agent 14D is preferred to be from about 5 mPa·s to about 200 mPa·s, more preferably from about 5 mPa·s to about 100 mPa·s, and further preferably from about 5 mPa·s to about 50 mPa·s.

The measurement of viscosity is performed as follows. The viscosity of the ink prepared is measured by using RHEOMAT 115 (manufactured by Contraves). A sample is placed into a measuring vessel and the vessel is installed in an apparatus by a predetermined method and then the measurement is carried out at 40° C. at shear rate of 1400 s$^{-1}$.

The surface tension of the releasing agent 14D is preferred to be about 40 mN/m or less (preferably about 30 mN/m or less, more preferably about 25 mN/m or less).

The measurement of surface tension is performed as follows. As the surface tension, the value measured under the conditions of 23±0.5° C., 55±5% RH by the use of the WILL- HERMY type surface tension meter (manufactured by Kyowa Interface Science Co., Ltd.) is used.

The boiling point of the releasing agent 14D is, for example, in the range of 250° C. or more (preferably about 300° C. or more, more preferably about 350° C. or more) under 760 mmHg.

Measurement of the boiling point is performed as follows. It is measured in accordance with JIS K2254 and an initial boiling point is used as the boiling point.

Next, the surface of the intermediate transfer body 12 is charged with the reverse polarity of the ink receptive particles 16 by the charging device 28. Then, the ink receptive particle layer 16A is formed on the charged surface of the intermediate transfer body 12. At this time, as the method of forming the ink receptive particle layer 16A, a general method of supplying an electrophotographic toner on a photoreceptor may be applied. That is, a charge is supplied in advance on the surface of the intermediate transfer body 12 by general charging for an electrophotographic method (charging by the charging device 28 or the like). The ink receptive particles 16 are frictionally charged so as to make a counter charge to the charge on the surface of the intermediate transfer body 12 (one-component frictional charging method or two-component method).

The ink receptive particles 16 held on the supply roll 18A form an electric field together with the surface of the intermediate transfer body 12, and are moved/supplied onto the intermediate transfer body 12 and held thereon by an electrostatic force. At this time, by the thickness of the image layer 16B formed on the ink receptive particle layer 16A (depending on an amount of the ink to be applied), the thickness of the ink receptive particle layer 16A can be also controlled. In this case, the absolute value of the charging amount of ink receptive particles 16 is preferred to be in the range of from about 5 µc/g to about 50 µc/g.

Here, the thickness of the ink receptive particle layer 16A is preferred to be from about 1 µm to about 100 µm, more preferably from about 1 µm to about 50 µm, further preferably from about 5 µm to about 25 µm. The porosity of the ink receptive particle layer (that is, porosity of voids between ink receptive particles+porosity of voids in ink receptive particles (trap structure)) is preferably from about 10% to about 80%, more preferably from about 30% to about 70%, and further preferably from about 40% to about 60%.

A particle supply process corresponding to one-component supply (development) system will be explained below.

The ink receptive particles 16 are supplied on a supply roll 18A, and charged by a charging blade 18B while the thickness of the particle layer is regulated.

The charging blade 18B has a function of regulating the layer thickness of the ink receptive particles 16 on the surface of the supply roll 18A, and can change the layer thickness of the ink receptive particles 16 on the surface of the supply roll 18A by varying the pressure on the supply roll 18A. By controlling the layer thickness of the ink receptive particles 16 on the surface of the supply roll 18A to one layer, the layer thickness of the ink receptive particles 16 formed on the surface of the intermediate transfer body 12 can be formed in substantially one layer. Alternatively, by controlling the pressing force on the charging blade 18B to be low, the layer thickness of the ink receptive particles 16 formed on the surface of the supply roll 18A can be increased, and the thickness of the ink receptive particle layer 16A of the ink receptive particles 16 formed on the surface of the intermediate transfer body 12 can be increased.

In other methods, when the peripheral speed of the intermediate transfer body 12 and the supply roll 18A forming one particle layer on the surface of the intermediate transfer body 12 to be 1, by increasing the peripheral speed of the supply roll 18A, the number of ink receptive particles 16 supplied on the intermediate transfer body 12 can be increased, and it can be controlled so as to increase the thickness of the ink receptive particle layer 16A on the intermediate transfer body 12. Further, the layer thickness can be regulated by combining the above methods. In this configuration, for example, the ink receptive particles 16 are charged negatively, and the surface of the intermediate transfer body 12 is charged positively.

By thus controlling the layer thickness of the ink receptive particle layer 16A, consumption of the ink receptive particle layer 16A is suppressed, and a pattern of which the surface is consistently covered with a protective layer may be formed.

As the charging roll in the charging device 28, it is possible to use a roll of from 10 mm to 25 mm in diameter, having an elastic layer dispersed with a conductive material on the outer surface of bar or pipe member which is made of aluminum, stainless steel or the like, and having volume resistivity adjusted to approximately from $10^6$ Ω·cm to $10^8$ Ω·cm.

The elastic layer includes resin materials such as urethane resin, thermoplastic elastomer, epichlorhydrine rubber, ethylene-propylene-diene copolymer rubber, silicon type rubber, acrylonitrile-butadiene copolymer rubber, or polynorbornene rubber. These resin materials may be used alone or in combination. A preferred material is a foamed urethane resin.

The foamed urethane resin is preferably a resin having closed cell structure formed by mixing and dispersing a hollow body such as hollow glass beads or microcapsules of thermal expansion type in a urethane resin.

Further, the surface of the elastic layer may be coated with a water repellent coating layer of from 5 µm to 100 µm in thickness.

A DC power source is connected to the charging device 28, and the driven roll 31 is electrically connected to the frame ground. The charging device 28 is driven together with the driven roll 31, while the intermediate transfer body 12 is disposed between the charging device 28 and the driven roll 31, and at the pressed position, a specified potential difference occurs against the grounded driven roll 31.

<Marking Process>

Ink droplets 20A are ejected from the ink jet recording head 20 based on an image signal, on the layer (ink receptive particle layer 16A) of the ink receptive particles 16 formed on the surface of the intermediate transfer body 12, and an image is formed. The ink droplets 20A ejected from the ink jet recording head 20 are loaded to the ink receptive particle layer 16A, and the ink droplets 20A are promptly absorbed by voids formed between ink receptive particles 16 and a recording material (e.g. pigment) is trapped on the surface of the ink receptive particles 16 or the voids between particles forming the ink receptive particles 16.

In this case, preferably, it is desired to trap many recording materials (e.g. pigment) on the surface of the ink receptive particle layer 16A. This is realized when voids between the particles of the ink receptive particles 16 have filter effects of trapping the recording materials (e.g. pigment) on the surface of ink receptive particle layer 16A, and the recording materials are trapped and fixed in the voids between the particles of the ink receptive particles 16.

To trap the recording material (e.g. pigment) securely near the surface of the ink receptive particle layer 16A and in the voids between the ink receptive particles 16, the ink may react with the ink receptive particles 16, and hence, the recording material (e.g. pigment) may be quickly made insoluble (aggregated). Specifically, this reaction may be realized by making use of reaction between ink and polyhydric metal salt, or pH reaction type.

A line type ink jet recording head having a width that is equal to or larger than the recording medium is preferred, however by using a conventional scan type ink jet recording head, images may be formed sequentially on the particle layer formed on the intermediate transfer body. The ink ejecting device of the ink jet recording head 20 is not particularly limited as long as it is a means capable of ejecting ink, such as piezoelectric element drive type, or heater element drive type. The ink itself may be ink using a conventional dye as a coloring material, however pigment ink is more preferable.

When the ink receptive particles 16 react with the ink, the ink receptive particles 16 are treated with an aqueous solution containing an aggregating agent (e.g. polyvalent metal salt and organic acid) which has effects of aggregating the pigment by reacting with ink, and dried before use.

<Transfer Process>

The ink receptive particle layer 16A in which an image is formed by receiving the ink drops 20A is transferred and fixed on the recording medium 8, and therefore, an image is formed on the recording medium 8. The transfer and fixing may be done in separate processes. However, the transfer and fixing is preferably done substantially at the same time. The fixing may be effected by any one of heating or pressing methods of the ink receptive particle layer 16A, or by using both of heating and pressing methods, but preferably by heating and pressing substantially at the same time.

By controlling heating/pressing, the surface properties of the ink receptive particle layer 16A can be controlled, and the degree of gloss can be controlled. After heating/pressing, when peeling the recording medium 8 on which an image (the ink receptive particle layer 16A) is transferred from the intermediate transfer body 12, it may be peeled off after cooling of the ink receptive particle layer 16A. Examples of the cooling method include natural cooling and forced cooling such as air-cooling. In these processes, the intermediate transfer body 12 is preferred to be of belt shape.

The ink image is formed on the surface layer of the ink receptive particles 16 formed on the intermediate transfer body 12 (the recording material (pigment) is trapped on the surface of the ink receptive particle layer 16A), and transferred on the recording medium 8, and therefore the ink image is formed so as to be protected by the particle layer 16C composed of the ink receptive particles 16.

The ink liquid component (solvent or dispersion medium), which is received/held in the layer of the ink receptive particles 16, is held in the layer of the ink receptive particles 16 after transfer and fixing, and removed by natural drying.

<Cleaning Process>

To allow repetitive use by refreshing the surface of the intermediate transfer body 12, a process of cleaning the surface by a cleaning device 24 is needed. The cleaning device 24 includes a cleaning part and a recovery part for conveying particles (not shown), and by the cleaning process, the ink receptive particles 16 (residual particles 16D) remaining on the surface of the intermediate transfer body 12, and deposits sticking to the surface of the intermediate transfer body 12 such as foreign matter (paper dust of recording medium 8 and others) other than particles can be removed. The collected residual particles 16D may be recycled.

<Neutralizing Process>

Before forming the releasing layer 14A, using the neutralizer 29, the surface of the intermediate transfer body 12 may be neutralized.

In the recording apparatus of the above-described exemplary embodiment, a releasing agent 14D is applied on the surface of the intermediate transfer body 12 using the releasing agent supplying device 14 and a releasing layer 14A is formed, and then the surface of the intermediate transfer body is charged by the charging device 28. Next, on the charged region on the releasing layer of the intermediate transfer body 12, ink receptive particles 16 are supplied from the particle supplying device 18, and a particle layer is formed. Then, on the particle layer, ink droplets are ejected from the ink jet recording head 20 to form an image. Thus, the ink receptive particles 16 have received the ink. After that, by nipping the recording medium 8 and the intermediate transfer body 12, and applying pressure and heat to the ink receptive particle layer 16A by the transfer fixing device 22, the ink receptive particle layer 16A is transferred and fixed onto the recording medium 8.

In addition, the recording apparatus is not limited to the form of an intermediate transfer system, it may be another form of directly supplying ink receptive particles on a recording medium as described below.

Figure 8:
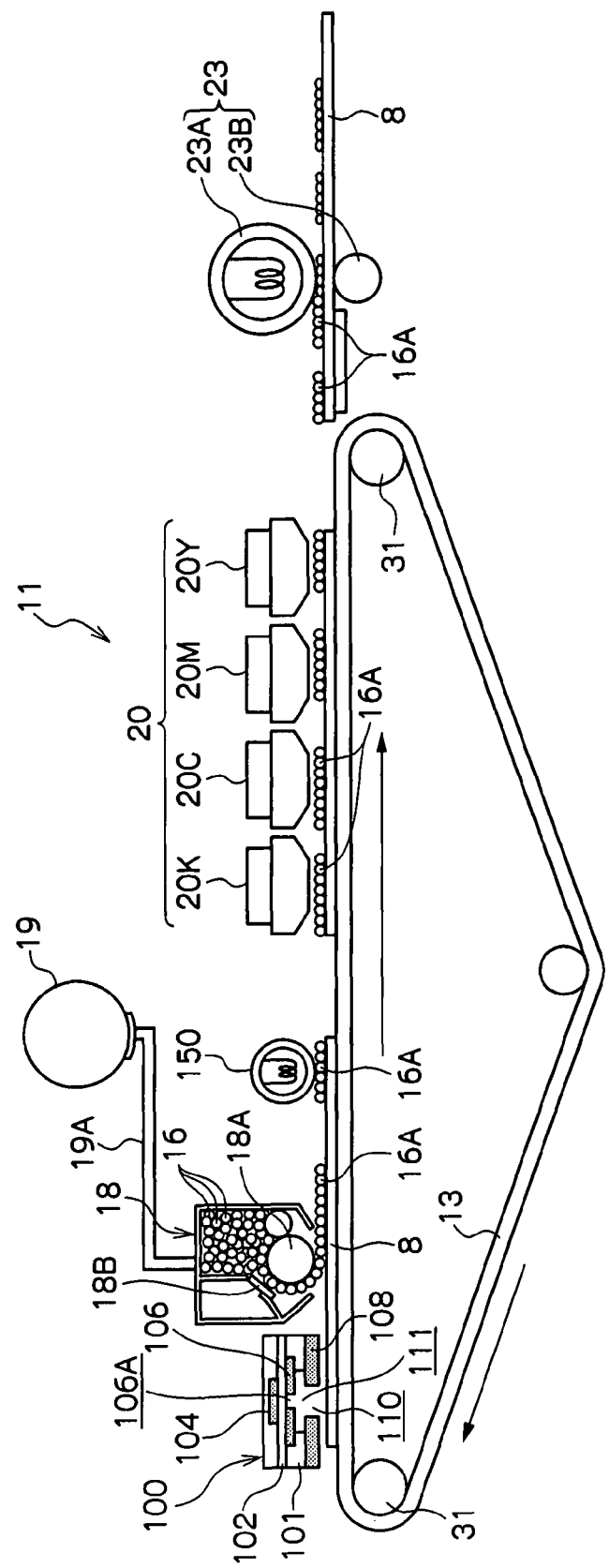
FIG. 8 is a block diagram showing the recording apparatus according to another exemplary embodiment.
Figure 9:
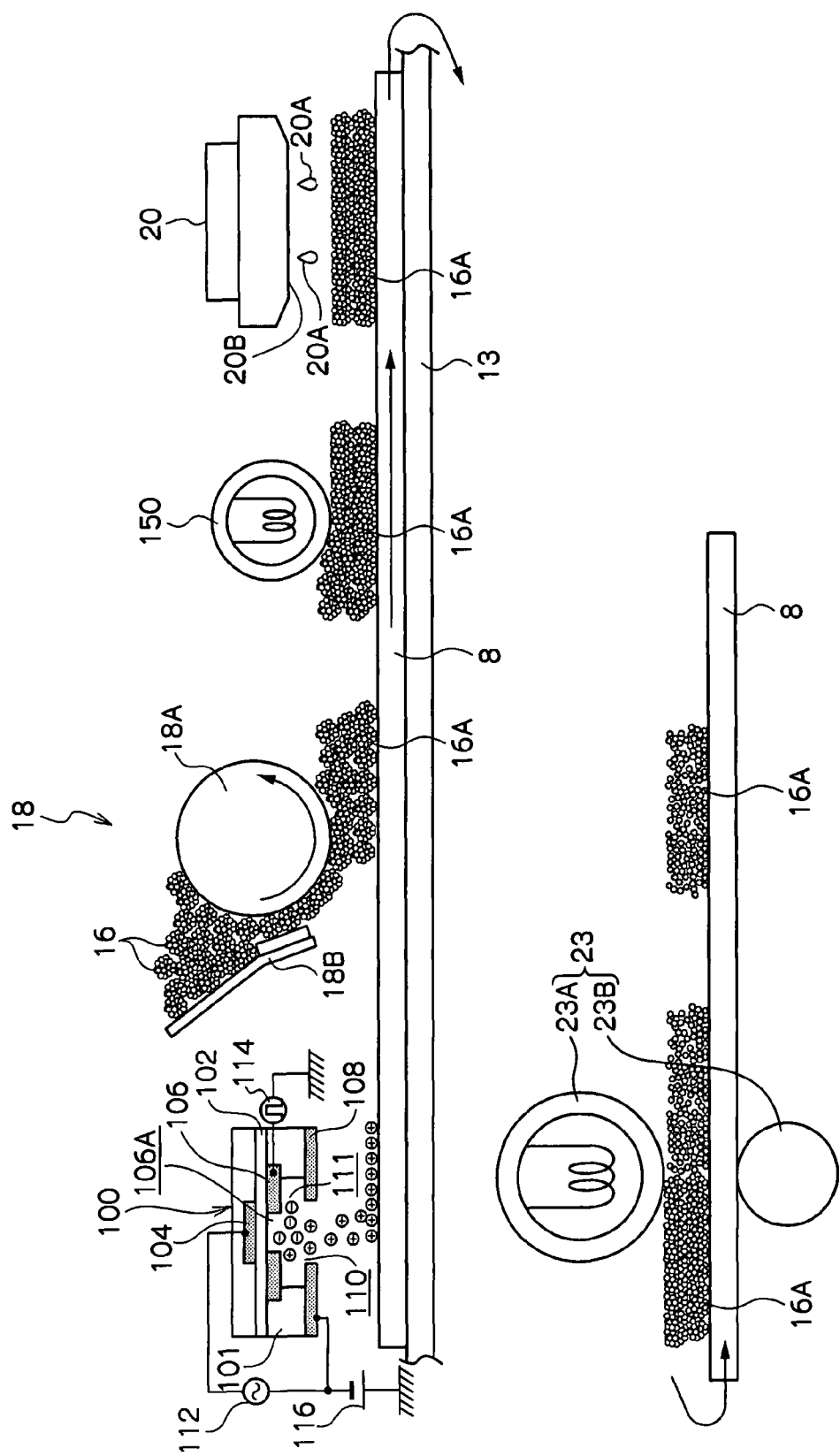
FIG. 9 is a block diagram showing a major portion of the recording apparatus according to another exemplary embodiment.

FIG. 8 is a block diagram showing the recording apparatus according to another exemplary embodiment. FIG. 9 is a block diagram showing a major portion of the recording apparatus according to another exemplary embodiment. In other exemplary embodiments below, the case where composite particles are applied as the ink receptive particles which will be described later is explained.

A recording apparatus 11 in other exemplary embodiments has a transportation belt 13, shaped like an endless belt as shown in FIG. 9. The transportation belt 13 is rotationally moved to deliver the recording medium 8 which is sent from a holding container (not shown).

First, an ion current control type electrostatic recording head 100 (hereinafter, abbreviated as "electrostatic recording head 100") controls an ion current generated by discharge and irradiates the recording medium 8 being delivered by the transportation belt 13 with the ion current, which results in the formation of an electrostatic latent image (see FIG. 10(A)).

The electrostatic latent image formed on the recording medium 8 is visualized by the ink receptive particle supplying device 18 and the ink receptive particle layer 16A composed of ink receptive particles 16 is formed (see FIG. 10(B)).

The ink receptive particle layer 16A formed on the recording medium 8 is preheated and fixed by a pre-fixing device 150.

On the formed ink receptive particle layer 16A which is preheated and fixed, ink droplets 20A in each color (see FIG. 9) are ejected from the ink jet recording heads 20K, 20C, 20M, and 20Y (in each color, that is, in black (K), cyan (C), magenta (M), and yellow (Y) colors) on the basis of image data, and an ink image is formed (See FIG. 10(C)). Hereafter, Y, M, C, and K are indicated after each symbol when it is necessary to distinguish each color. Unless otherwise distinguished, Y, M, C, and K are not repeated.

The ink receptive particle layer 16A in which the ink image is formed by ejecting the ink droplets 20A is fixed on the recording medium 8 by pressurizing and heating by a fixing device 23.

The electrostatic recording head 100 and ink jet recording head 20 indicate a line type ink jet recording head having a width more than the width of the recording medium 8, the so-called FWA (Full Width Array) system.

Next, constituent elements as well as a process of forming an image will be specifically described below.

The recording medium 8 is delivered by the transportation belt 13, shaped like an endless belt. In the exemplary embodiment, the recording medium 8 is transferred in the state adhering to the transportation belt 13.

Here, one example of the method of adsorbing the recording medium 8 to the transportation belt 13 includes a suction mechanism in which a pore (not shown) is provided in the transportation belt 13 and the recording medium is aspirated from this pore, which is then adsorbed onto the transportation belt 13. Other examples of the method of adsorbing the recording medium 8 to the transportation belt 13 may include a method in which the recording medium 8 is adsorbed electrostatically to the transportation belt 13 or a method in which the recording medium 8 is adhered by adhesion.

At the upstream side of the transporting direction, the electrostatic recording head 100 which forms an electrostatic latent image is placed on the upstream side of the recording medium 8 being delivered by transportation belt 13 at intervals.

In the electrostatic recording head 100, a plurality of driving electrodes 104 are provided on the surface of an insulated substrate 102 of a plane rectangular shape so as to be parallel to each other, and a plurality of control electrodes 106 are formed on the back side so as to intersect with these driving electrodes 104. The matrix (grating) is formed by the driving electrode 104 and the control electrode 106. In the control electrode 106, a circular opening 106A is formed in the position which intersects with the driving electrode 104. On the underside of the control electrode 106, a screen electrode 108 is provided through the insulated substrate 101. In these insulated substrate 101 and screen electrode 108, a space 111 and an opening for ion transport 110 are formed in the position corresponding to the opening 106A of the control electrode 106.

A high frequency high voltage is applied between the driving electrode 104 and the screen electrode 108 by an alternating current power supply 112. On the other hand, in response to image information, a pulse voltage is applied to the control electrode 106 by an ion control power supply 114. Further, a direct voltage is applied to the screen electrode 108 by a direct current power supply 116.

A corona surface discharge is induced in a space 111 by applying an alternating electric field between the driving electrode 104 and the control electrode 106 which are insulated in this manner and then the ion generated by this corona surface discharge is accelerated or absorbed by the electric field formed between the control electrode 106 and the screen electrode 108. Then, discharge of an ionic current from the opening for ion transport 110 is controlled and an electrostatic latent image (see FIG. 10(A)) is formed on the surface of the recording medium 8 by an ion (positive ion in the exemplary embodiment) responding to an image signal (ink image).

A potential of the electrostatic latent image may be a potential capable of supplying and adsorbing ink receptive particles 16 onto the recording medium 8 by an electrostatic force of electric field which can be formed by a particle supply roll 18A of the ink receptive particle supplying device 18 and the electrostatic latent image formed on the recording medium 8.

The region in which an electrostatic latent image is formed can be selected by this electrostatic recording head 100. Therefore, the electrostatic latent image formed on the surface of the recording medium 8 is the region in which an ink image is formed. For example, an ink image can be formed as conceptually shown in FIG. 10(A).

The recording medium 8 in which an electrostatic latent image is formed on the surface is delivered to the ink receptive particle supplying device 18. Thus, the electrostatic latent image is visualized and then the ink receptive particle layer 16A corresponding to the electrostatic latent image is formed (see FIG. 10(B)). Thus, in only the region of an ink image which is formed based on an image signal, the ink receptive particle layer 16A is formed on the recording medium 8 (the ink receptive particle layer 16A is hardly formed in a non-image area region).

Next, a process of forming an image will be described.

As shown in FIG. 10(A), then the ink receptive particle layer 16A formed on the recording medium 8 is pre-fixed by the pre-fixing device 150.

The ink receptive particle layer 16A formed on the recording medium 8 is fixed on the recording medium 8 by an electrostatic force. Thus, when ink droplets 20A ejected from the ink jet recording head 20 are loaded to the ink receptive particle layer 16A in the next process, the ink receptive particle layer 16A may be deteriorated depending on the amount of ink. For this reason, the ink receptive particles 16 are provisionally fixed on the surface of the recording medium 8 by preliminary pre-fixing the ink receptive particle layer 16A in advance.

The scattering of the ink receptive particles 16 by load of the ink droplets 20A and contamination of a nozzle face 20B of the ink jet recording head 20 are prevented by pre-fixing.

The temperature of preheating by the pre-fixing device 150 is lower than that of heating for final fixing in the fixing device 23. That is, the process of pre-fixing by the pre-fixing device 150 does not involve completely melting resin particles in the ink receptive particles 16 and fixing by pressure, but remaining voids between particles and fixing particles and binding particles to the surface of the recording medium. Thus, the ink droplets 20A are pre-fixed to the extent that the droplets can be received.

In the pre-fixing device 150, a heating and fixing device (fuser) generally used for an electrophotographic image forming device can be applied. In addition to the heating and fixing device (fuser) generally used for an electrophotographic image forming device, a heater heating method, an oven system, an electromagnetic induction heating system, and the like may be used.

Next, the recording medium 8 in which preliminary fixing of the ink receptive particle layer 16A has been carried out is conveyed under the ink jet recording head 20.

Ink droplets 20A ejected from the ink jet recording head 20 based on image data are loaded to the ink receptive particle layer 16A formed on the recording medium 8, and the ink image is formed (see FIG. 10 (C)). In this case, the ink is received in the ink receptive particles 16.

To write an image at high speed, as in the exemplary embodiment, a line type ink jet recording head having a width more than a recording medium width is preferred, however by using a scan type ink jet recording head, images may be formed sequentially. The ink ejecting device of the ink jet recording head 20 is not particularly limited as long as it is a means capable of ejecting ink, such as piezoelectric element drive type, or heater element drive type.

Next, the recording medium 8 is peeled off from the transportation belt 13 and delivered to the fixing device 23, and then pressure and heat are applied to the receptive ink receptive particle layer 16A, thereby fixing the ink receptive particle layer 16A on the recording medium 8.

The fixing device 23 is composed of a heating roll 23A incorporating a heating source and a pressurizing roll 23B which is opposed to the heating roll 23A, and the heating roll 23A and pressurizing roll 23B contact each other to form a contact region. The heating roll 23A and pressurizing roll 23B are formed of an aluminum core, coated with silicone rubber on the outer surface, and are further covered with a PFA tube. Here, the fixing device 23 has the same configuration as the fixing device (fuser) used for an electrophotographic image forming device. In addition to the heating and fixing device generally used for an electrophotographic image forming device, a heater heating method, an oven system, an electromagnetic induction heating system, and the like may be used.

When the recording medium 8 is passed through the contact region of the heating roll 23A and the pressurizing roll 23B, the ink receptive particle layer 16A is heated and pressurized, and thus ink receptive particle layer 16A is fixed to the recording medium 8. Other than the method using both heating and pressurizing, the method using only heating and pressurizing may be utilized. However, the manner in which heating and pressurizing are performed at the same time is preferable.

The image formation is completed through the above process and the recording medium 8 is taken out of the device.

In the recording apparatus 11 in other exemplary embodiments as described above, while the recording medium 8 is delivered by the transportation belt 13, an electrostatic latent image is formed by the electrostatic recording head 100. The ink receptive particles 16 are supplied to the electrostatic latent image by the particle supplying device 18 to form a particle layer. Then, on the particle layer, ink droplets are ejected from the ink jet recording head 20 to form an image. Thus, the ink receptive particles 16 have received the ink. Next, the recording medium 8 is peeled off from the transportation belt 13, and then pressure and heat are applied thereto by the fixing device 23, so that the ink receptive particle layer is fixed on the recording medium 8. The process except for the above-mentioned description is the same as that of the recording apparatus in the above-mentioned exemplary embodiment and therefore it will not be repeated here.

In the exemplary embodiments, ink droplets 20A are selectively ejected from the ink jet recording heads 20 in black, yellow, magenta, and cyan colors on the basis of image data, and a full-color image is recorded on the recording medium 8. However, the exemplary embodiments of the invention are not limited to the recording of characters or images on a recording medium. That is, the liquid droplet ejection apparatus used in the exemplary embodiments of the invention can be applied generally to liquid droplet ejection (jetting) apparatuses used industrially.

EXAMPLES

Hereinbelow, the present invention will be specifically described with reference to Examples. However, the respective examples are not intended to limit the scope of the invention.

-Preparation of Particles A-
Styrene/n-butylacrylate/acrylic acid copolymer: 100 parts by mass (acid value 200, weight average molecular weight Mw 51,000)

The above-mentioned material is dissolved in 1000 parts by mass of acetone. 150 parts by mass of sodium hydroxide aqueous solution (at a concentration of 55%) are added to this solution, and then 10 parts by mass of aggregating agent (PAC) are added thereto. This solution is stirred at room temperature (25° C.) for 1 hour. This dispersion is dried at −40° C. using a freeze dryer and particles are produced. Further, these particles are classified using an air classifier.

Then, 0.4 part by mass of hydrophilic silica (AEROSIL130: average spherical equivalent diameter 16 nm) and 0.6 part by mass of hydrophobic silica (AEROSIL R972: average spherical equivalent diameter 16 nm) are added to the thus obtained particles and the mixture is agitated by a mixer, and ink receptive particles of average spherical equivalent diameter of 6 μm are obtained.

In the ink receptive particles, hydrophilic group having a salt structure [COO⁻group (Na salt): molar ratio]=20 mol %, hydrophilic group not having a salt structure [COOH-group: molar ratio]=15 mol %, and hydrophobic group [residue: molar ratio]=65 mol %.

-Preparation of Particles B-
Styrene/methyl methacrylate/methacrylic acid copolymer: 98 parts by mass (acid value 300, weight average molecular weight Mw 28,000)
Calcium acetate: 2 parts by mass The above-mentioned mixture is mixed and agitated in a HENSCHEL mixer, and kneading material is obtained. The mixture is put into an extruder, and fused and kneaded. The obtained kneaded mixture is cooled and crushed by using a jet mill, followed by classifying using an air classifier. 100 parts by weight of sodium hydroxide aqueous solution (at a concentration of 5%) is sprayed on the prepared particles for one second, which is then dried.

Then, 0.4 part by mass of hydrophilic silica (AEROSIL130: average spherical equivalent diameter 16 nm) and 0.4 part by mass of hydrophobic silica (AEROSIL R972: average spherical equivalent diameter 16 nm) are added to the thus obtained particles and the mixture is agitated by a mixer, and ink receptive particles of average spherical equivalent diameter of 10 μm are obtained.

In the ink receptive particles, hydrophilic group having a salt structure [COO⁻group (Na salt): molar ratio]=25 mol %, hydrophilic group not having a salt structure [COOH-group: molar ratio]=25 mol %, and hydrophobic group [residue: molar ratio]=50 mol %.

-Preparation of Particles C-
Styrene/2-ethylhexylmethacrylate/4-hydroxybutylacrylate/acrylic acid copolymer 100 parts by mass (acid value 180, hydroxy value 90, weight average molecular weight Mw 48,000)

The above-mentioned material is dissolved in 800 parts by mass of acetone. 200 parts by mass of sodium hydroxide aqueous solution (at a concentration of 5%) are added to this solution, and then 8 parts by mass of aggregating agent (polyallylamine) are added thereto. This solution is stirred at room temperature (25° C.) for 1 hour. This dispersion is dried at −40° C. using a freeze dryer and particles are produced. Further, these particles are classified using an air classifier.

Then, 0.5 part by mass of hydrophilic silica (AEROSIL130: average spherical equivalent diameter 16 nm) and 0.5 part by mass of hydrophobic silica (AEROSIL R974: average spherical equivalent diameter 12 nm) are added to the thus obtained particles and the mixture is agitated by a mixer, and ink receptive particles of average spherical equivalent diameter of 11 μm are obtained.

In the ink receptive particles, hydrophilic group having a salt structure [COO⁻group (Na salt): molar ratio]=35 mol %, hydrophilic group not having a salt structure [COOH-group+OH⁻group: molar ratio]=8 mol %, and hydrophobic group [residue: molar ratio]=50 mol %.

-Preparation of Particles D-
Styrene/2-ethylhexylacrylate/sulfonic acid vinyl/maleic anhydride copolymer: 100 parts by mass (acid value 320, weight average molecular weight Mw 72,000)

The above-mentioned material is crushed by using a jet mill and subjected to an air classifier, which results in particles. 300 parts by weight of potassium hydroxide aqueous solution (at a concentration of 5%) is sprayed on the prepared particles, which are then dried. Then, these particles are classified using an air classifier.

Then, 0.5 part by mass of hydrophilic silica (AEROSIL130: average spherical equivalent diameter 16 nm) and 0.5 part by mass of hydrophobic silica (AEROSIL R974: average spherical equivalent diameter 12 nm) are added to the thus obtained particles and the mixture is agitated by a mixer, and ink receptive particles of average spherical equivalent diameter of 9 μm are obtained.

In the ink receptive particles, hydrophilic group having a salt structure [COO⁻group (K salt): molar ratio]=35 mol %, hydrophilic group not having a salt structure [COOH-group+ sulfonic group: molar ratio]=15 mol %, and hydrophobic group [residue: molar ratio]=50 mol %.

-Preparation of Particles E-
Styrene/butadiene/2-ethylhexylmethacrylate/methacrylic acid copolymer: 100 parts by mass (acid value 280, weight average molecular weight Mw 48,000)

The above-mentioned material is added to 250 parts by mass of ethylenediamine aqueous solution (at a concentration of 10%), which is stirred at 75° C. for 12 hours. The obtained aqueous solution is subjected to a rotary evaporator to remove water and then the resultant solid is ground by a jet mill. Then, these particles are classified using an air classifier.

Then, 0.6 part by mass of hydrophilic silica (AEROSIL130: average spherical equivalent diameter 16 nm) and 0.4 part by mass of hydrophobic silica (AEROSIL R972: average spherical equivalent diameter 16 nm) are added to the thus obtained particles and the mixture is agitated by a mixer, and ink receptive particles of average spherical equivalent diameter of 6 μm are obtained.

In the ink receptive particles, hydrophilic group having a salt structure [COO⁻group (amine salt): molar ratio]=8 mol %, hydrophilic group not having a salt structure [COOH-group: molar ratio]=42 mol %, and hydrophobic group [residue: molar ratio]=50 mol %.

-Preparation of Particles F-
Styrene/n-butylmethacrylate/acrylic acid copolymer: 100 parts by mass (acid value 480, weight average molecular weight Mw 31,000)

The above-mentioned material is dissolved in 1000 parts by mass of acetone. 90 parts by mass of lithium hydroxide aqueous solution (at a concentration of 5%) are added to this solution, and then 10 parts by mass of aggregating agent (polydiallyldimethylammonium chloride) are added thereto. This solution is stirred at room temperature (25° C.) for 1 hour. This dispersion is dried at −40° C. using a freeze dryer and particles are produced. Further, these particles are classified using an air classifier.

Then, 0.5 part by mass of hydrophilic silica (AEROSIL200: average spherical equivalent diameter 12 nm) and 0.5 part by mass of hydrophobic silica (AEROSIL R972: average spherical equivalent diameter 16 nm) are added to the thus obtained particles and the mixture is agitated by a mixer, and ink receptive particles of average spherical equivalent diameter of 15 μm are obtained.

In the ink receptive particles, hydrophilic group having a salt structure [COO⁻group (Li salt): molar ratio]=44 mol %, hydrophilic group not having a salt structure [COOH-group: molar ratio]=51 mol %, and hydrophobic group [residue: molar ratio]=5 mol %.

-Preparation of Particles G-
Styrene/n-butylmethacrylate/acrylic acid copolymer: 100 parts by mass (acid value 80, weight average molecular weight Mw 47,000)

The above-mentioned material is dissolved in 1000 parts by weight of acetone. 70 parts by mass of sodium hydroxide aqueous solution (at a concentration of 5%) are added to this solution, and then 10 parts by mass of aggregating agent (PAC) are added thereto. This solution is stirred at room temperature (25° C.) for 1 hour. This dispersion is dried at −40° C. using a freeze dryer and particles are produced. Further, these particles are classified using an air classifier.

Then, 0.8 part by mass of hydrophilic silica (AEROSIL130: average spherical equivalent diameter 16 nm) and 0.2 part by mass of hydrophobic silica (AEROSIL R972: average spherical equivalent diameter 16 nm) are added to the thus obtained particles and the mixture is agitated by a mixer, and ink receptive particles of average spherical equivalent diameter of 8 μm are obtained.

In the ink receptive particles, hydrophilic group having a salt structure [COO⁻group (Na salt): molar ratio]=14 mol %, hydrophilic group not having a salt structure [COOH-group: molar ratio]=11 mol %, and hydrophobic group [residue: molar ratio]=75 mol %.

-Preparation of Particles H-
Styrene/2-ethylhexylacrylate/methacrylic acid copolymer: 100 parts by mass (acid value 350, weight average molecular weight Mw 76,000)

The above-mentioned mixture is mixed and agitated in a HENSCHEL mixer, and kneading material is obtained. The mixture is put into an extruder, and fused and kneaded. The obtained kneaded mixture is cooled and crushed by using a jet mill, followed by classifying using an air classifier. 200 parts by weight of potassium hydroxide aqueous solution (at a concentration of 5%) is sprayed on the prepared particles with a spray, which are then dried.

Then, 0.4 part by mass of hydrophilic silica (AEROSIL130: average spherical equivalent diameter 16 nm) and 0.6 part by mass of hydrophobic silica (AEROSIL R972: average spherical equivalent diameter 16 nm) are added to the thus obtained particles and the mixture is agitated by a mixer, and ink receptive particles of average spherical equivalent diameter of 10 μm are obtained.

In the ink receptive particles, hydrophilic group having a salt structure [COO⁻group (Na salt): molar ratio]=32 mol %, hydrophilic group not having a salt structure [COOH-group: molar ratio]=46 mol %, and hydrophobic group [residue: molar ratio]=22 mol %.

-Preparation of Particles I-
Styrene/n-butylacrylate/acrylic acid copolymer: 100 parts by mass (acid value 210, weight average molecular weight Mw 48,000)

The above-mentioned material is cooled and crushed by using a jet mill, followed by classifying using an air classifier.

Then, 0.2 part by mass of hydrophilic silica (AEROSIL200: average spherical equivalent diameter 12 nm) and 0.8 part by mass of hydrophobic silica (AEROSIL R974: average spherical equivalent diameter 12 nm) are added to the thus obtained particles and the mixture is agitated by a mixer, and ink receptive particles of average spherical equivalent diameter of 7 μm are obtained.

In the ink receptive particles, hydrophilic group having a salt structure [COO⁻group (Na salt): molar ratio]=0 mol %, hydrophilic group not having a salt structure [COOH-group: molar ratio]=50 mol %, and hydrophobic group [residue: molar ratio]=50 mol %.

-Preparation of Particles J-

Styrene/n-butylacrylate/acrylic acid copolymer: 100 parts by mass (acid value 110, weight average molecular weight Mw 22,000)

The above-mentioned material is dissolved in 1000 parts by weight of acetone. 250 parts by mass of potassium hydroxide aqueous solution (at a concentration of 5%) are added to this solution, and then 10 parts by mass of aggregating agent (polyallylamine) are added thereto. This solution is stirred at room temperature (25° C.) for 1 hour. This dispersion is dried at −40° C. using a freeze dryer and particles are produced. Further, these particles are classified using an air classifier.

Then, 0.8 part by mass of hydrophobic silica (AEROSIL R972: average spherical equivalent diameter 16 nm) is added to the thus obtained particles and the mixture is agitated by a mixer, and ink receptive particles of average spherical equivalent diameter of 5 μm are obtained.

In the ink receptive particles, hydrophilic group having a salt structure [COO⁻group (Na salt): molar ratio]=27 mol %, hydrophilic group not having a salt structure [COOH-group: molar ratio]=0 mol %, and hydrophobic group [residue: molar ratio]=73 mol %.

-Preparation of Ink A-

The following ink components are mixed and agitated, and then filtered by a membrane filter of 5 μm pore size to prepare ink.

| | |
|---|---|
| Carbon black: | 5 parts by mass |
| Styrene-acrylic acid resin: | 2 parts by mass |
| Glycerol: | 17 parts by mass |
| Triethylene glycol mono-butyl ether: | 8 parts by mass |
| Propylene glycol: | 8 parts by mass |
| Surfactant (acetylene glycol): | 1 part by mass |
| Sodium hydroxide aqueous solution: | proper quantity |
| Water: | remainder |

A sodium hydroxide aqueous solution is added to adjust the pH of the prepared ink to 8.8. At this time, the ink viscosity is 4.8 mPa·s and the surface tension is 32 mN/m.

-Preparation of Ink B-

The following ink components are mixed and agitated, and then filtered by a membrane filter of 5 μm pore size to prepare ink.

| | |
|---|---|
| C.I. Pigment Blue: | 10 parts by mass |
| Styrene methacrylic acid resin: | 4 parts by mass |
| Glycerol: | 14 parts by mass |
| Diethylene glycol mono-butyl ether: | 2 parts by mass |
| Isopropyl alcohol: | 4 parts by mass |
| Surfactant (acetylene glycol ethyleneoxide adduct): | 2 parts by mass |
| Sodium hydroxide aqueous solution: | proper quantity |
| Water: | remainder |

A sodium hydroxide aqueous solution is added to adjust the pH of the prepared ink to 10.5. At this time, the ink viscosity is 9.7 mPa·s and the surface tension is 33 mN/m.

-Preparation of Ink C-

The following ink components are mixed and agitated, and then filtered by a membrane filter of 5 μm pore size to prepare ink.

| | |
|---|---|
| Carbon black: | 5 parts by mass |
| Styrene acrylic acid resin: | 2 parts by mass |
| Glycerol: | 17 parts by mass |
| Triethylene glycol mono-butyl ether: | 8 parts by mass |
| Propylene glycol: | 8 parts by mass |
| Surfactant (acetylene glycol ethyleneoxide adduct): | 1 part by mass |
| Sodium hydroxide aqueous solution: | proper quantity |
| Water: | remainder |

A sodium hydroxide aqueous solution is added to adjust the pH of the prepared ink to 7.2. At this time, the ink viscosity is 5.1 mPa·s and the surface tension is 32 mN/m.

-Preparation of Ink D-

The following ink components are mixed and agitated, and then filtered by a membrane filter of 5 μm pore size to prepare ink.

| | |
|---|---|
| Carbon black: | 5 parts by mass |
| Styrene acrylic acid resin: | 2 parts by mass |
| Glycerol: | 17 parts by mass |
| Triethylene glycol mono-butyl ether: | 8 parts by mass |
| Propylene glycol: | 8 parts by mass |
| Surfactant (polyoxyethylene alkyl ether): | 1 part by mass |
| Sodium hydroxide aqueous solution: | proper quantity |
| Water: | remainder |

A sodium hydroxide aqueous solution is added to adjust the pH of the prepared ink to 6.8. At this time, the ink viscosity is 5.4 mPa·s and the surface tension is 32 mN/m.

Examples 1 to 9 and Comparative Examples 1 to 4

According to Table 1, the above described particles (ink receptive particles) and ink are used and evaluated as follows. The results are shown in Table 1.

Evaluation

-Drying Time-

Drying time is evaluated as follows. Particles are sprayed on a PET film using a cake printer. At this time, an amount of spraying particles is in the range of from 25 g/m² to 35 g/m². Then, 5 pL of ink per one drop is applied onto the PET film on which the particles are sprayed at an image area ratio of 1200 dpi×1200 dpi (dpi: dot number per inch) using a piezo inkjet device, which results in preparation of 100% coverage pattern. Thereafter, regular paper (trade name: C2 paper, manufactured by Fuji Xerox Co., Ltd.) is pressed against particles to which the ink is attached at a pressure of 10⁵ Pa and then time until it is no longer transferred is measured. Criteria of evaluation are as follows.

Excellent: drying time is less than 0.25 sec.

Good: drying time is 0.25 sec. or more and less than 0.75 sec.

Poor: drying time is 0.75 sec. or more and less than 1.0 sec.

-Ink Bleeding-

Ink bleeding is evaluated as follows. Particles are sprayed on a PET film using a cake printer. At this time, an amount of spraying particles is in the range of from 25 g/m² to 35 g/m². Then, 5 pL of ink per one drop is applied onto the PET film on which the particles are sprayed at an image area ratio of 1200 dpi×1200 dpi (dpi: dot number per inch) using a piezo inkjet device, which results in preparation of three-dot line pattern. The obtained line pattern is observed with eyes or under a microscope (magnification: 1000 times). Criteria of evaluation are as follows.

Excellent: ink bleeding cannot be observed even when a microscope is used.

Good: ink bleeding can be observed when the microscope is used, however it cannot be observed with eyes.

Poor: ink bleeding is observed with eyes.

Bad: an image cannot be formed.

-Charging Property-

Charging property is evaluated in the state where particles are sprayed on a pet film using a cake printer. Criteria of evaluation are as follows.

Excellent: when observed under a microscope, particles are sprayed on a film without unevenness.

Good: when observed with eyes, particles are sprayed on a film without unevenness.

Poor: although an unevenness is present, particles can be sprayed.

Bad: particles cannot be sprayed.

What is claimed is:

1. An ink receptive particle comprising an organic resin that is formed by a hydrophilic monomer component and a hydrophobic monomer component, wherein hydrophilic groups in the organic resin include a hydrophilic group having a salt structure and a hydrophilic group not having a salt structure, a molar ratio of the hydrophilic group having a salt structure is in a range of from 5 mol % to 40 mol % relative to a total amount of monomer component composing the ink receptive particle, a molar ratio of the hydrophilic group not having a salt structure is in a range of from 5 mol % to 50 mol % relative to a total amount of monomer component composing the ink receptive particle, and the ink receptive particle has a hydrophobic group and a molar ratio of the hydrophobic group is in a range of from 40 mol % to 70 mol % relative to a total amount of monomer component composing the ink receptive particle.

TABLE 1

| | Particles | Ink | Average spherical equivalent diameter (μm) | Ratio mol % | | | | Drying time | Bleeding | Image turbulence |
| | | | | Hydrophobic group | Hydrophilic group having salt structure | Hydrophilic group not having salt structure | Hydrophilic group not having salt structure and hydrophilic group having salt structure | | | |
|---|---|---|---|---|---|---|---|---|---|---|
| Example 1 | A | A | 6 | 65 | 20 | 15 | 35 | Excellent | Excellent | Excellent |
| Example 2 | B | A | 10 | 50 | 25 | 25 | 50 | Excellent | Excellent | Good |
| Example 3 | C | A | 11 | 50 | 35 | 8 | 43 | Excellent | Good | Good |
| Example 4 | D | B | 9 | 50 | 35 | 15 | 50 | Excellent | Good | Good |
| Example 5 | E | C | 6 | 50 | 8 | 42 | 50 | Good | Excellent | Good |
| Example 6 | F | A | 15 | 5 | 44 | 51 | 95 | Excellent | Poor | Excellent |
| Example 7 | A | D | 6 | 65 | 20 | 15 | 35 | Good | Excellent | Excellent |
| Example 8 | G | A | 8 | 75 | 14 | 11 | 25 | Poor | Poor | Excellent |
| Example 9 | H | B | 10 | 22 | 32 | 46 | 78 | Excellent | Excellent | Poor |
| Comparative Example 1 | I | A | 7 | 50 | 0 | 50 | 50 | Poor | Bad | Good |
| Comparative Example 2 | J | C | 5 | 73 | 27 | 0 | 27 | Bad | Poor | Good |

The above results show that the drying time and bleeding as well as charging property in Examples are excellent as compared to Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

2. The ink receptive particle of claim 1, wherein the hydrophilic group having the salt structure is a derivative of a same hydrophilic group as the hydrophilic group not having the salt structure.

3. The ink receptive particle of claim 1, wherein the hydrophilic groups that are contained in the hydrophilic group having a salt structure and the hydrophilic group not having a salt structure are carboxyl groups.

4. The ink receptive particle of claim 1, wherein the ink receptive particle is a composite particle in which at least a plurality of particles are aggregated.

5. The ink receptive particle of claim 4, wherein a component of an ink is trapped in gaps between the particles of the composite particle.

6. The ink receptive particle of claim 4, wherein an ink includes a recording material, and the recording material is trapped in gaps between the particles of the composite particle.

7. A material for recording comprising an ink and the ink receptive particle of claim 1.

8. The material for recording of claim 7, wherein pH of the ink is about 7 or more.

9. A recording apparatus comprising:
an intermediate transfer body;
a supply device that supplies the ink receptive particle of claim 1 onto the intermediate transfer body;
an ink ejecting device that ejects an ink toward the ink receptive particle supplied onto the intermediate transfer body;
a transfer device that transfers the ink receptive particle onto a recording medium; and
a fixing device that fixes the ink receptive particle transferred onto the recording medium,
the ink receptive particle being supplied on the intermediate transfer body and receiving the ink ejected from the ink ejecting device.

10. A recording apparatus comprising:
an intermediate transfer body;
a supply device that supplies the ink receptive particle of claim 4 onto the intermediate transfer body;
an ink ejecting device that ejects an ink toward the ink receptive particle supplied onto the intermediate transfer body;
a transfer device that transfers the ink receptive particle onto a recording medium; and
a fixing device that fixes the ink receptive particle transferred onto the recording medium,
the ink receptive particle being supplied on the intermediate transfer body and receives the ink ejected from the ink ejecting device.

11. A recording apparatus comprising:
an intermediate transfer body;
a supply device that supplies the ink receptive particle of claim 6 onto the intermediate transfer body;
an ink ejecting device that ejects an ink toward the ink receptive particle supplied onto the intermediate transfer body;
a transfer device that transfers the ink receptive particle onto a recording medium; and
a fixing device that fixes the ink receptive particle transferred onto the recording medium,
the ink receptive particle being supplied on the intermediate transfer body and receiving the ink ejected from the ink ejecting device.

12. A recording apparatus comprising:
a supply device that supplies the ink receptive particle of claim 1 onto a recording medium;
an ink ejecting device that ejects an ink toward the ink receptive particle supplied onto the recording medium; and
a fixing device that fixes the ink receptive particle supplied onto the recording medium,
the ink receptive particle being supplied on the recording medium and receiving the ink ejected from the ink ejecting device.

13. A recording apparatus comprising:
a supply device that supplies the ink receptive particle of claim 4 onto a recording medium;
an ink ejecting device that ejects an ink toward the ink receptive particle supplied onto the recording medium; and
a fixing device that fixes the ink receptive particle supplied onto the recording medium,
the ink receptive particle being supplied on the recording medium and receiving the ink ejected from the ink ejecting device.

14. A recording apparatus comprising:
a supply device that supplies the ink receptive particle of claim 6 onto a recording medium;
an ink ejecting device that ejects an ink toward the ink receptive particle supplied onto the recording medium; and
a fixing device that fixes the ink receptive particle supplied onto the recording medium,
the ink receptive particle being supplied on the recording medium and receiving the ink ejected from the ink ejecting device.

15. The recording apparatus of claim 9, wherein pH of the ink is about 7 or more.

16. The recording apparatus of claim 12, wherein pH of the ink is about 7 or more.

17. An ink receptive particle storage cartridge, which is detachably disposed in a recording apparatus and holds the ink receptive particle of claim 1.

* * * * *